United States Patent
Kim et al.

(10) Patent No.: US 9,813,132 B2
(45) Date of Patent: Nov. 7, 2017

(54) METHOD AND APPARATUS FOR TRANSMITTING CHANNEL STATE INFORMATION IN WIRELESS COMMUNICATION SYSTEM

(71) Applicant: LG Electronics Inc., Seoul (KR)

(72) Inventors: Hyungtae Kim, Seoul (KR); Kijun Kim, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 14/767,764

(22) PCT Filed: Apr. 29, 2014

(86) PCT No.: PCT/KR2014/003796
§ 371 (c)(1),
(2) Date: Aug. 13, 2015

(87) PCT Pub. No.: WO2014/178616
PCT Pub. Date: Nov. 6, 2014

(65) Prior Publication Data
US 2015/0381253 A1  Dec. 31, 2015

Related U.S. Application Data

(60) Provisional application No. 61/817,270, filed on Apr. 29, 2013, provisional application No. 61/821,192, filed on May 8, 2013.

(51) Int. Cl.
*H04B 7/06* (2006.01)
*H04W 72/04* (2009.01)
(Continued)

(52) U.S. Cl.
CPC ......... *H04B 7/0626* (2013.01); *H04B 7/0478* (2013.01); *H04B 7/0482* (2013.01);
(Continued)

(58) Field of Classification Search
CPC .. H04B 7/0626; H04B 7/0486; H04B 7/0632; H04B 7/10; H04B 7/0478; H04B 7/0465;
(Continued)

(56) References Cited

U.S. PATENT DOCUMENTS 8,208,576 B2 * 6/2012 Ihm ................. H04B 7/0417
375/267
2010/0260243 A1 * 10/2010 Ihm ................. H04B 7/024
375/219
(Continued)

FOREIGN PATENT DOCUMENTS

KR  1020120031894  4/2012
KR  1020120031895  4/2012
(Continued)

OTHER PUBLICATIONS

3GPP TS 36.211 V10.4.0 (Dec. 2011), Technical Specification Group Radio Access Network, Evolved Universal Terrestrial Radio Access (E-UTRA)_Medium Access Control (MAC) protocol specification_(Release 10), teaches and describes the E-UTRA MAC protocol.*
(Continued)

*Primary Examiner* — Andrew Lai
*Assistant Examiner* — Hoyet H Andrews, III
(74) *Attorney, Agent, or Firm* — Dentons US LLP

(57) ABSTRACT

The present invention relates to a wireless communication system. According to one embodiment of the present invention, a method for transmitting, by a terminal, channel state information (CSI) in a wireless communication system comprises the steps of: subsampling a code book for four antenna ports; and feeding back the CSI on the basis of the subsampled code book, wherein the CSI includes a rank
(Continued)

indicator (RI) reported together with a precoding type indicator (PTI), and if the RI is greater than 2, the PTI is set to one.

14 Claims, 15 Drawing Sheets

(51) Int. Cl.
  *H04L 1/00* (2006.01)
  *H04B 7/04* (2017.01)
  *H04L 5/00* (2006.01)
  *H04L 25/03* (2006.01)
(52) U.S. Cl.
  CPC ........... *H04B 7/0486* (2013.01); *H04B 7/063* (2013.01); *H04B 7/0632* (2013.01); *H04B 7/0639* (2013.01); *H04L 1/0026* (2013.01); *H04L 1/0027* (2013.01); *H04L 5/0057* (2013.01); *H04L 25/03898* (2013.01); *H04W 72/0413* (2013.01)
(58) Field of Classification Search
  CPC .. H04B 7/0469; H04B 7/0452; H04B 7/0456; H04B 7/024; H04B 7/063; H04B 7/0639; H04W 72/0413; H04L 25/03898; H04L 1/06; H04L 25/03866; H04L 1/001; H04L 1/0026; H04L 1/0072
  See application file for complete search history.

(56) References Cited

U.S. PATENT DOCUMENTS

| | | | |
|---|---|---|---|
| 2012/0008613 A1* | 1/2012 | Lee | H04B 7/0452 370/338 |
| 2012/0045019 A1* | 2/2012 | Li | H04B 7/0413 375/296 |
| 2012/0076028 A1 | 3/2012 | Ko et al. | |
| 2012/0087425 A1 | 4/2012 | Gomadam et al. | |
| 2012/0207243 A1* | 8/2012 | Koivisto | H04B 7/0469 375/296 |
| 2012/0294382 A1* | 11/2012 | Wang | H04B 7/0691 375/267 |
| 2012/0328031 A1* | 12/2012 | Pajukoski | H04L 25/03942 375/259 |

FOREIGN PATENT DOCUMENTS

| | | |
|---|---|---|
| KR | 1020120094938 | 8/2012 |
| RU | 2011-141858 A | 4/2013 |
| WO | 2012046155 | 4/2012 |

OTHER PUBLICATIONS

R1-112145, presented at 3GPP TSG-RAN1 Meeting #66; Athens, Greece, Aug. 22-26, 2011 titled Correction on RI feedback of Mode 2-1 for TM9 with 8 CSI-RS ports configuration and RI feedback description, (R1-112145 hereinafter) was published Aug. 2011.*
TS 36 213 V10.2.0, titled "Technical Specification Group Radio Access Network; Evolved Universal Terrestrial Radio Access (E-UTRA); Physical layer procedures (Release 10)", (TS-36213 hereinafter) was originally published Dec. 2011.*
J. Meng and M. Shen, "A Scheme of Cyclic Delay Diversity Based Precoding for Downlink MIMO System," 2009 5th International Conference on Wireless Communications, Networking and Mobile Computing, Beijing, 2009, pp. 1-4, doi: 10.1109/WICOM.2009.5303671.*
N. Jindal, "A Feedback Reduction Technique for MIMO Broadcast Channels," 2006 IEEE International Symposium on Information Theory, Seattle, WA, 2006, pp. 2699-2703., doi: 10.1109/ISIT.2006.262144.*
International Search Report from PCT/KR2014/003796, dated Aug. 22, 2014.
Written Opinion of the ISA from PCT/KR2014/003796, dated Aug. 22, 2014.
New Postcom:, "4-Tx codebook design for downlink MIMO enhancement", 3GPP TSG RAN WG1 Meeting #72, R1-131114, Apr. 15-19, 2013, XP050697054.
Texas Instruments:, "Discussion on 4Tx codebook enhancement in Rel. 12", 3GPP TSG RAN WG1 #72bis, R1-131089, Apr. 15-19, 2013, XP050697046.
3GPP TS 36.213 V10.9.0 (Feb. 2013), "3rd Generation Partnership Project; Technical Specification Group Radio Acces Network; Evolved Universal Terrestrial Radio Access (E-UTRA); Physical layer procedures (Release 10)", XP050692113.
3GPP TS 36.213 V8.8.0 (Sep. 2009), "3rd Generation Partnership Project; Technical Specification Group Radio Access Network; Evolved Universal Terrestrial Radio Access (E-UTRA); Physical layer procedures (Release 8)", XP050377563.

* cited by examiner

FIG. 2
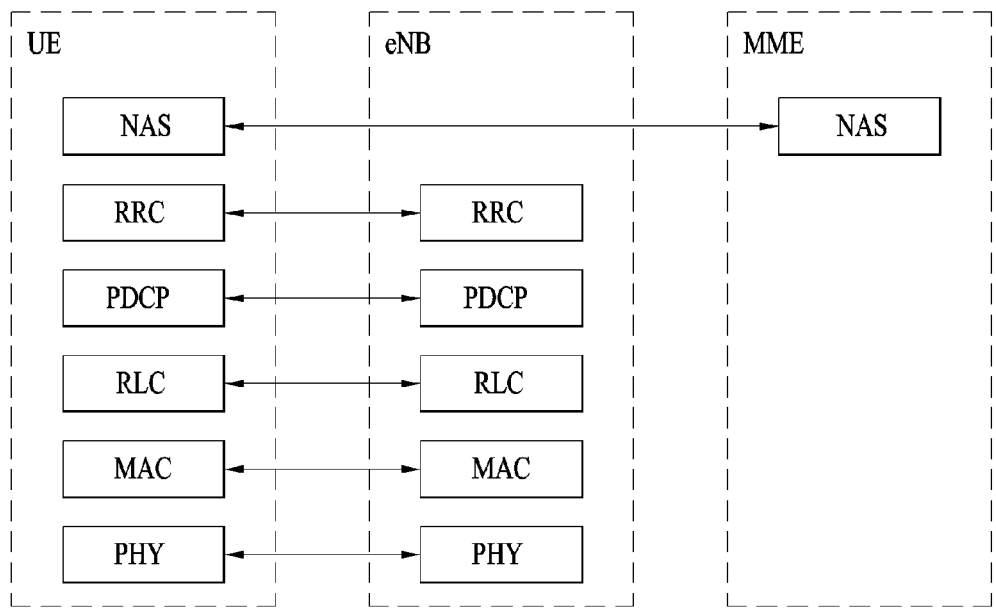
(a) CONTROL-PLANE PROTOCOL STACK
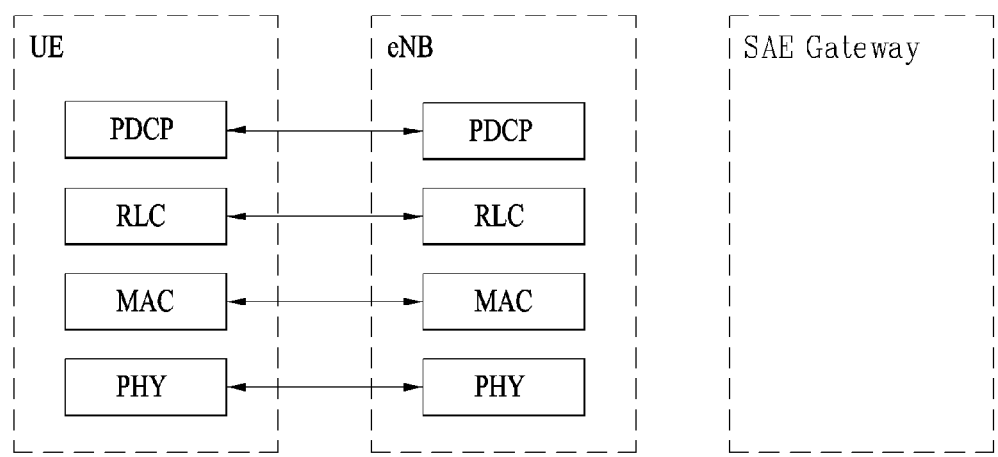
(b) USER-PLANE PROTOCOL STACK

| CQI REPORTING MODE | | PMI FEEDBACK TYPE | |
|---|---|---|---|
| | | NO PMI | SINGLE PMI |
| PUCCH CQI FEEDBACK TYPE | WIDEBAND (WIDEBAND CQI) | MODE 1-0 | MODE 1-1 |
| | UE-SELECTED (SUBBAND CQI) | MODE 2-0 | MODE 2-1 |

FIG. 14
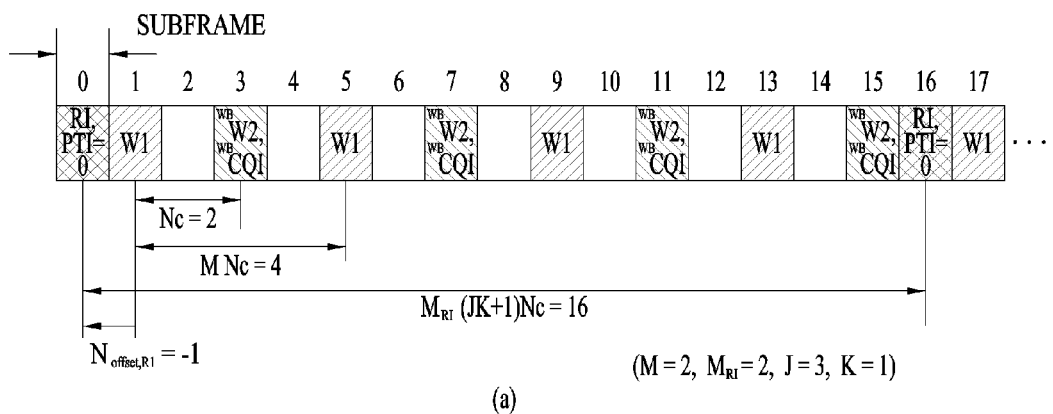
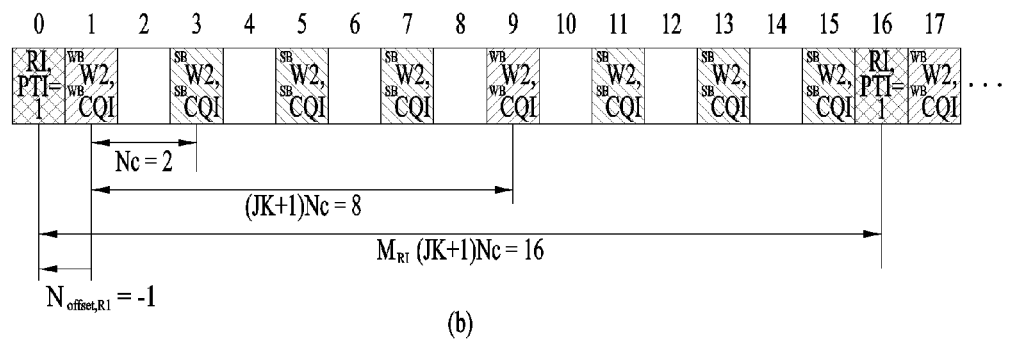
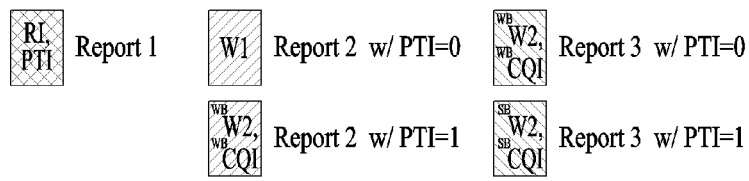

FIG. 15
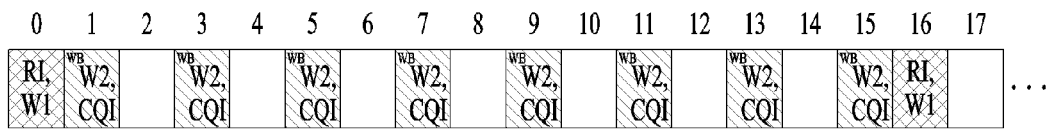
FIG. 16
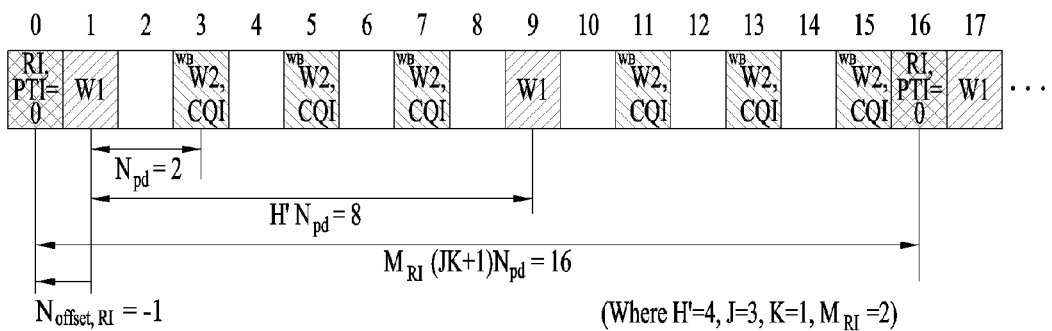
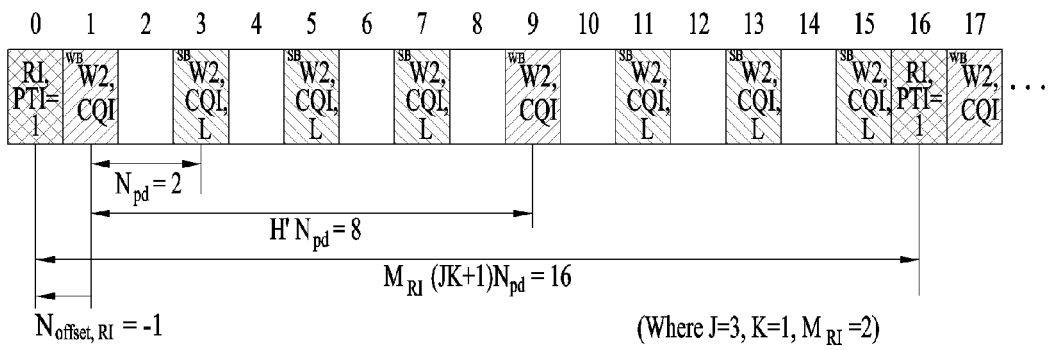

FIG. 17
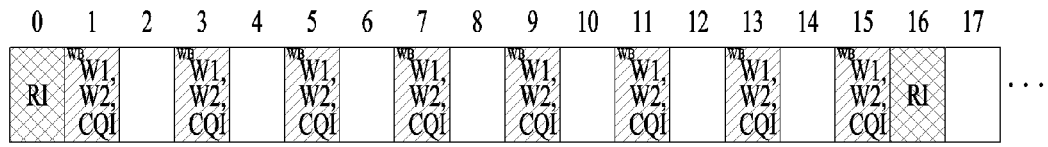
FIG. 18
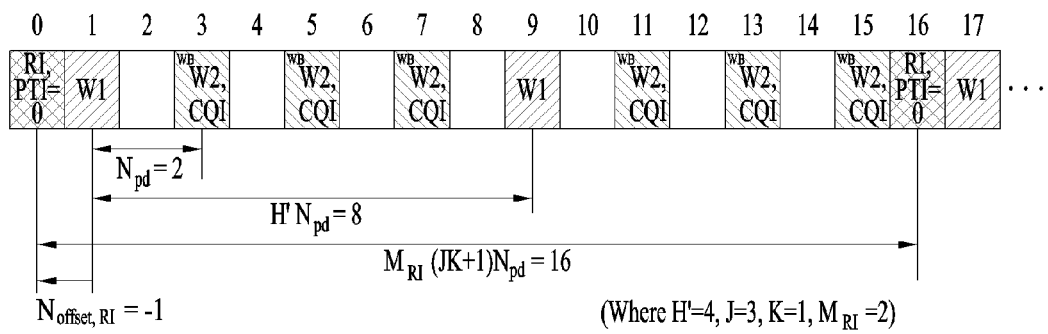
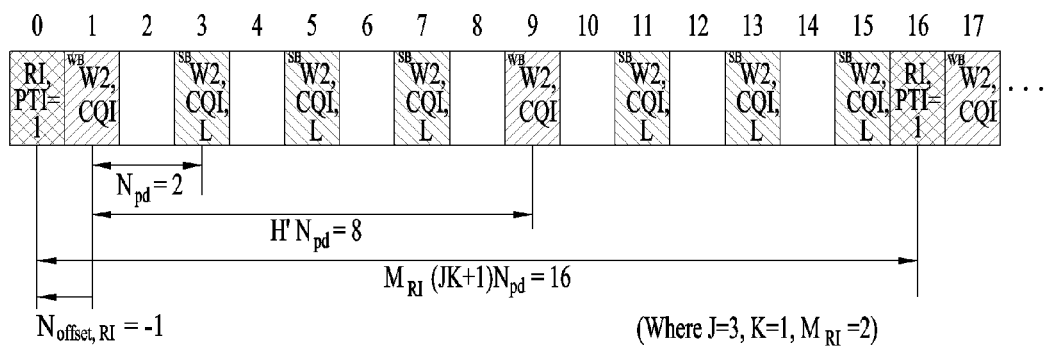

METHOD AND APPARATUS FOR TRANSMITTING CHANNEL STATE INFORMATION IN WIRELESS COMMUNICATION SYSTEM

This application is a 35 USC §371 National Stage entry of International Application No. PCT/KR2014/003796 filed on Apr. 29, 2014, and claims priority to U.S. provisional application Nos. 61/817,270 filed on Apr. 29, 2013 and 61/821,192 filed on May 8, 2013, all of which are hereby incorporated by reference in their entireties as if fully set forth herein.

TECHNICAL FIELD

The present invention relates to a wireless communication system, and more particularly, to a method and apparatus for transmitting channel state information using subsampling of a codebook in a wireless communication system.

BACKGROUND ART

A 3rd generation partnership project long term evolution (3GPP LTE) communication system will be described below as an exemplary mobile communication system to which the present invention is applicable.

FIG. 1 is a diagram schematically showing a network structure of an evolved universal mobile telecommunications system (E-UMTS) as an exemplary radio communication system. The E-UMTS system has evolved from the conventional UMTS system and basic standardization thereof is currently underway in the 3GPP. The E-UMTS may be generally referred to as a long term evolution (LTE) system. For details of the technical specifications of the UMTS and E-UMTS, refer to Release 7 and Release 8 of "3rd generation partnership project; technical specification group radio access network".

Referring to FIG. 1, the E-UMTS includes a user equipment (UE), eNBs (or eNode Bs or base stations), and an access gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and hybrid automatic repeat and request (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A core network (CN) may include the AG, a network node for user registration of the UE, and the like. The AG manages mobility of a UE on a tracking area (TA) basis, wherein one TA includes a plurality of cells.

Although radio communication technology has been developed up to LTE based on wideband code division multiple access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

Multiple-input multiple-output (MIMO) technology refers to a method for enhancing transmission and receiving data efficiency by employing multiple transmit antennas and multiple receive antennas instead of one transmit antenna and one receive antenna. That is, the MIMO technology enhances capacity or improves performance using multiple antennas in a transmitting end or a receiving end of a wireless communication system. The MIMO technology may also be referred to as multiple antenna technology.

In order to support multiple antenna transmission, a precoding matrix for appropriately distributing transmitted information according to a channel situation and so on can be applied to each antenna.

DISCLOSURE

Technical Problem

An object of the present invention devised to solve the problem lies in a method and apparatus for transmitting channel state information in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for transmitting channel state information (CSI) by a user equipment in a wireless communication system, the method including subsampling a codebook for a 4 antenna port, and feeding back CSI based on the subsampled codebook, wherein the CSI includes a rank indicator (RI) reported together with a precoding type indicator (PTI), and when the RI is greater than 2, the PTI is set to 1.

In another aspect of the present invention, provided herein is a user equipment for transmitting channel state information (CSI) in a wireless communication system, the user equipment including a radio frequency (RF) unit, and a processor, wherein the processor is configured to subsample a codebook for a 4 antenna port and to feedback CSI based on the subsampled codebook, the CSI includes a rank indicator (RI) reported together with a precoding type indicator (PTI), and when the RI is greater than 2, the PTI is set to 1.

The following features may be commonly applied to the above embodiments of the present invention.

The RI may be set to one of natural numbers equal to or less than 4

The CSI may be transmitted using physical uplink control channel mode 2-1 for reporting a single precoding matrix indicator (PMI) and a subband channel quality indicator (CQI).

When the RI is greater than 2, the subsampled codebook may include a first precoding matrix with an index 0, a third precoding matrix with an index 2, a ninth precoding matrix with an index 8, and an eleventh precoding matrix with an index 10.

The subsampling may include subsampling the codebook for the 4 antenna port according to $2I_{PMI2}+4\cdot\lfloor I_{PMI2}/2\rfloor$, and the IPMI2 may indicate an index of a precoding matrix with one of 0 to 3.

CSI configuration information for report of the CSI may be received.

The CSI configuration information may be transmitted using radio resource control (RRC) signaling.

It is to be understood that both the foregoing general description and the following detailed description of the present invention are exemplary and explanatory and are intended to provide further explanation of the invention as claimed.

Advantageous Effects

According to embodiments of the present invention, a method and apparatus for effectively transmitting channel state information using subsampling of a codebook in a wireless communication system is provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating a control plane and a user plane of a radio interface protocol between a UE and an evolved universal terrestrial radio access network (E-UTRAN) based on a 3rd generation partnership project (3GPP) radio access network standard;

FIG. 14 is a diagram illustrating periodic reporting of CSI when a hierarchical codebook is used;

FIG. 15 is a diagram illustrating an example of submode A of PUCCH feedback mode 1-1;

FIG. 16 illustrates PUCCH feedback mode 2-1 according to a PTI value;

FIG. 17 illustrates a submode B when a new codebook is applied;

FIG. 18 illustrates PUCCH feedback mode 2-1 according to a PTI value;

BEST MODE

Figure 1:
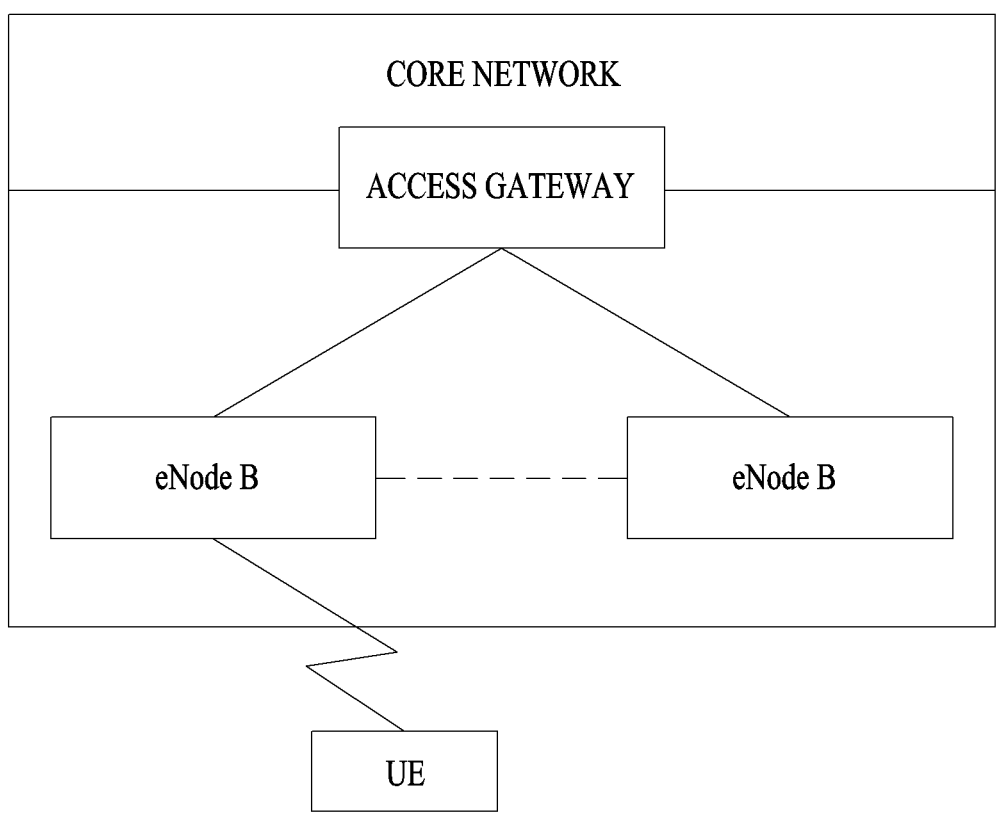
FIG. 1 is a diagram schematically showing a network structure of an evolved universal mobile telecommunications system (E-UMTS) as an exemplary radio communication system.

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
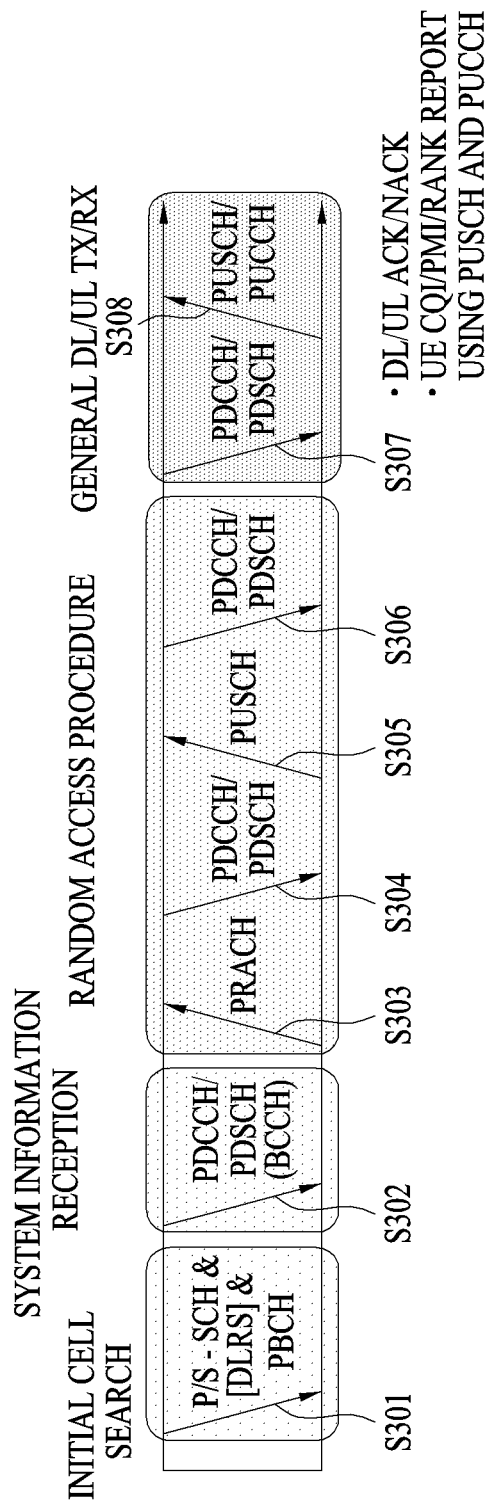
FIG. 3 is a diagram showing physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
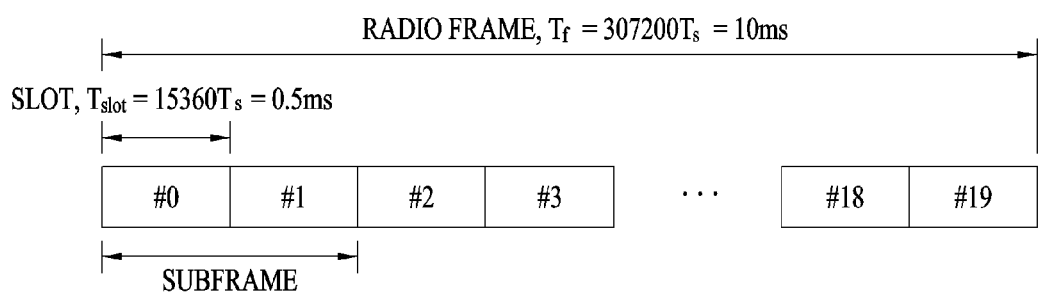
FIG. 4 is a diagram illustrating an example of the structure of a radio frame used in a long term evolution (LTE) system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by Ts=1/(15 kHz×2048)=3.2552×10−8 (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
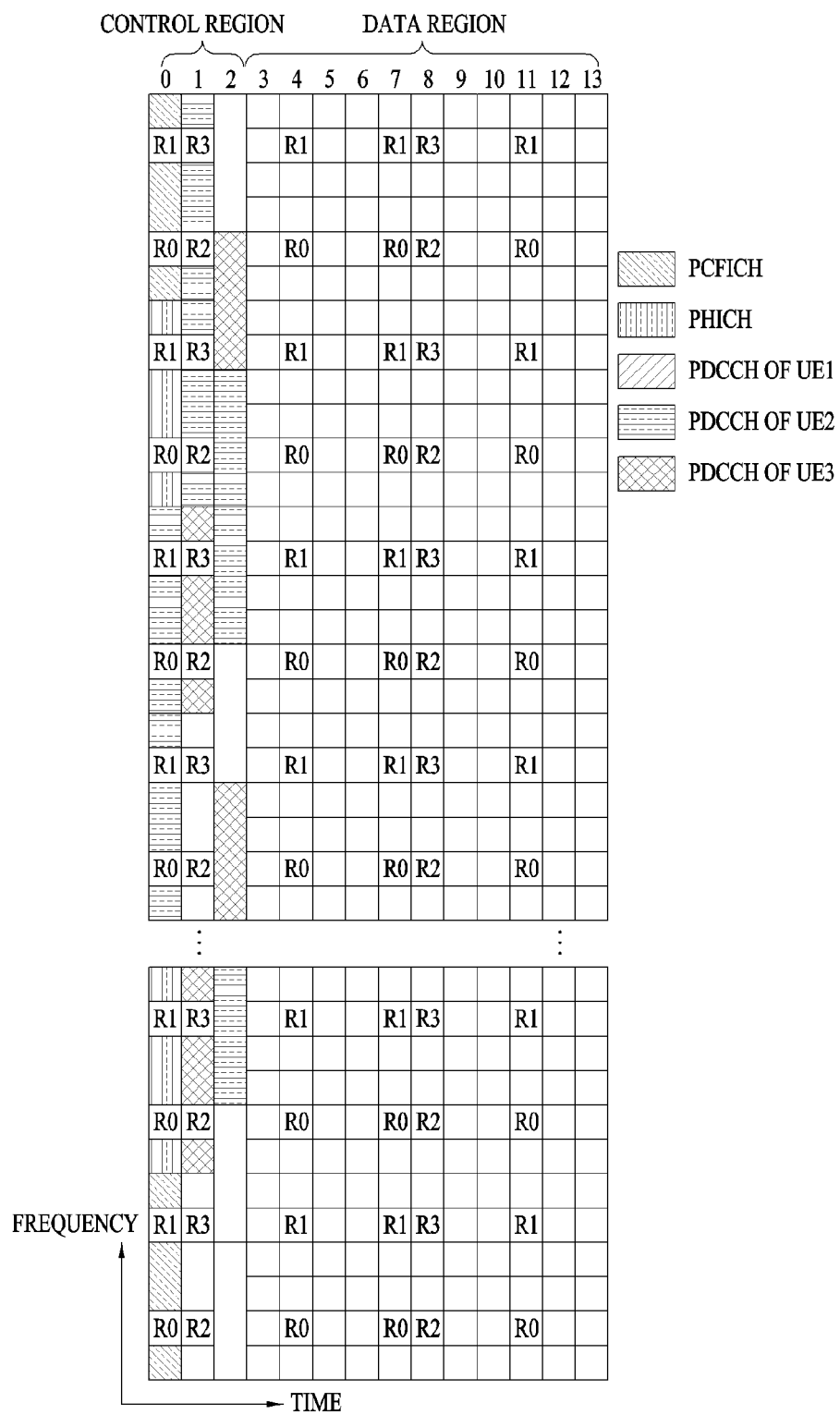
FIG. 5 is a diagram illustrating a control channel included in a control region of a subframe in a downlink radio frame.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
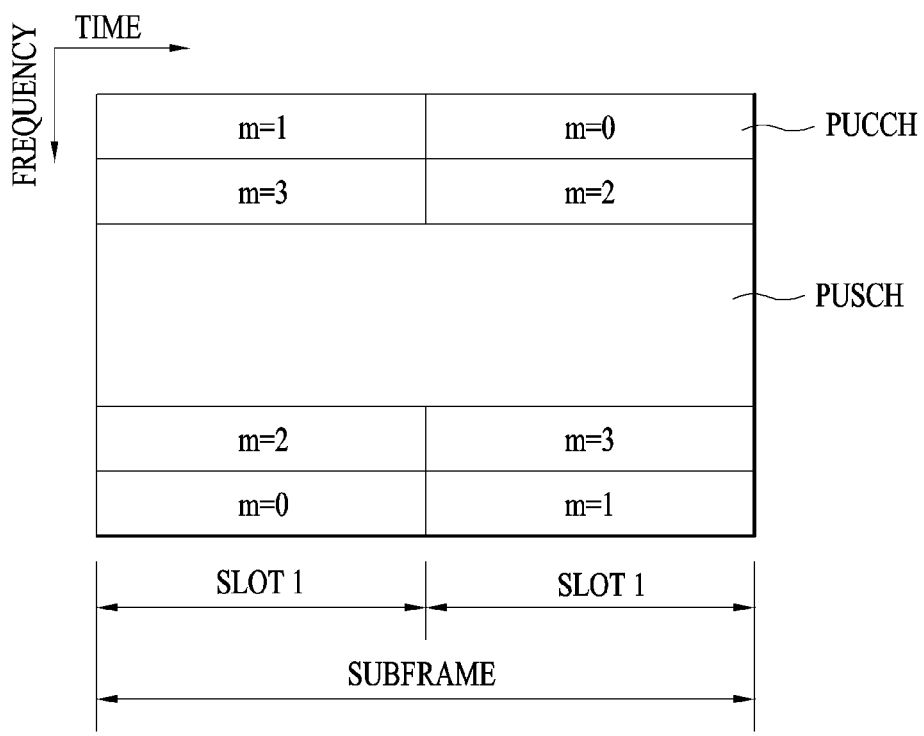
FIG. 6 is a diagram illustrating an uplink subframe structure used in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO System

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
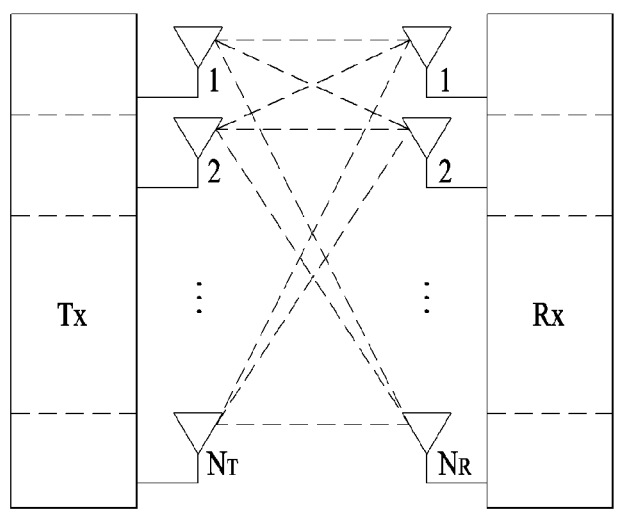
FIG. 7 illustrates the configuration of a typical multiple input multiple output (MIMO) communication system.

The configuration of a general MIMO communication system is shown in FIG. 7. A transmitting end is equipped with NT transmission (Tx) antennas and a receiving end is equipped with NR reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is Ro, a transfer rate using multiple antennas can be theoretically increased by the product of the maximum transfer rate Ro by a rate increment Ri. The rate increment Ri is represented by the following equation 1 where Ri is the smaller of NT and NR.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that NT Tx antennas and NR Rx antennas are present. In the case of a transmission signal, a maximum number of transmittable pieces of information is NT under the condition that NT Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_i \\ \vdots \\ \hat{s}_{N_T} \end{bmatrix} = W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'.

The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

CSI Feedback

Now, a description of a Channel State Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feed back CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1\ W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \quad \text{[Equation 9]}$$

-continued where $X_i$ is $Nt/2$ by $M$ matrix.

$$W2(j) = \overbrace{\begin{bmatrix} e_M^k & e_M^l & e_M^m \\ \alpha_j e_M^k & \beta_j e_M^l & \gamma_j e_M^m \end{bmatrix}}^{r\ columns} \text{(if rank} = r\text{),}$$

where $1 \leq k, l, m \leq M$ and $k, l, m$ are integer.

where Nt is the number of Tx antennas, M is the number of columns of a matrix Xi, indicating that the matrix Xi includes a total of M candidate column vectors. eMk, eMl, and eMm denote k-th, l-th, and m-th column vectors of the matrix Xi in which only k-th, l-th, and m-th elements among M elements are 0 and the other elements are 0, respectively. $\alpha_j$, $\beta_j$, and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

As described above, CSI in the LTE system includes, but is not limited to, CQI, PMI, and RI. According to transmission mode of each UE, all or some of the CQI, PMI, and RI is transmitted. Periodic transmission of CSI is referred to as periodic reporting and transmission of CSI at the request of an eNB is referred to as aperiodic reporting. In aperiodic reporting, a request bit included in uplink scheduling infor- mation transmitted by the eNB is transmitted to the UE. Then, the UE transmits CSI considering transmission mode thereof to the eNB through an uplink data channel (PUSCH). In periodic reporting, a period of CSI and an offset at the period are signaled in the unit of subframes by a semi-static scheme through a higher-layer signal per UE. The UE transmits CSI considering transmission mode to the eNB through an uplink control channel (PUCCH). If there is uplink data in a subframe in which CSI is transmitted, the CSI is transmitted through an uplink data channel (PUSCH) together with the uplink data. The eNB transmits transmission timing information suitable for each UE to the UE in consideration of a channel state of each UE and a UE distributed situation in a cell. The transmission timing information includes a period and an offset necessary for transmitting CSI and may be transmitted to each UE through an RRC message.

FIGS. 8 to 11 illustrate periodic reporting of CSI in an LTE system.

Figures 8, 9:
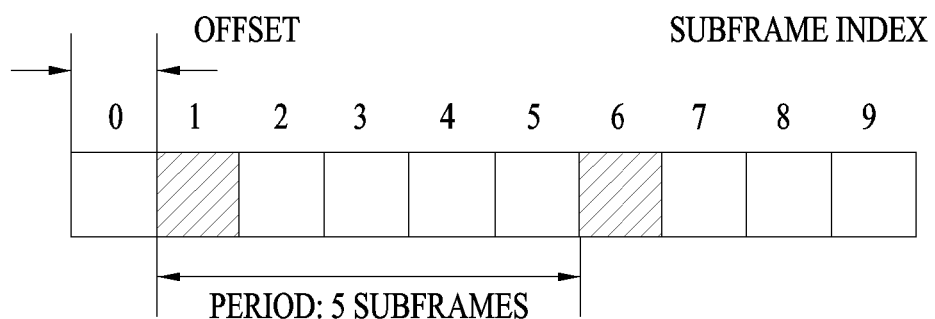
FIGS. 8 to 11 illustrate periodic reporting of channel state information (CSI)

Referring to FIG. 8, there are four CQI reporting modes in the LTE system. Specifically, the CQI reporting modes may be divided into modes in a WideBand (WB) CQI and modes in a SubBand (SB) CQI according to CQI feedback type. The CQI reporting mode may also be divided into modes in a No PMI and modes in a single PMI depending on whether a PMI is transmitted or not. Each UE is informed of information comprised of a period and an offset through RRC signaling in order to periodically report CQI.

FIG. 9 illustrates an example of transmitting CSI when a UE receives information indicating {a period '5' and an offset '1'} through signaling. Referring to FIG. 9, upon receiving the information indicating the period '5' and offset '1', the UE transmits CSI in the unit of 5 subframes with an offset of one subframe in ascending order of a subframe index counted from 0 starting from the first subframe. Although the CSI is transmitted basically through a PUCCH, if a PUSCH for data transmission is present at the same transmission time point, the CSI is transmitted through the PUSCH together with data. The subframe index is given as a combination of a system frame number (or a radio frame index) nf and a slot index ns (0 to 19). Since one subframe includes two slots, the subframe index may be defined as 10×nf+floor(ns/2) wherein floor( ) indicates the floor function.

CQI transmission types include a type of transmitting a WB CQI only and a type of transmitting both a WB CQI and an SB CQI. In the type of transmitting a WB CQI only, CQI information for all bands is transmitted in subframes corresponding to every CQI transmission period. Meanwhile, in the case in which PMI information should also be transmitted according to the PMI feedback type as illustrated in FIG. 8, the PMI information is transmitted together with the CQI information. In the type of transmitting both a WB CQI and an SB CQI, the WB CQI and SB CQI are alternately transmitted.

Figure 10:
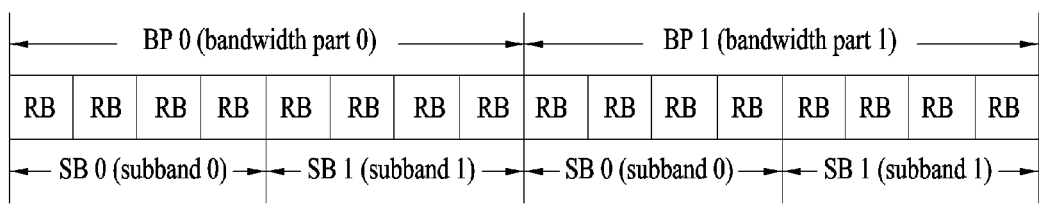
Figure 11:
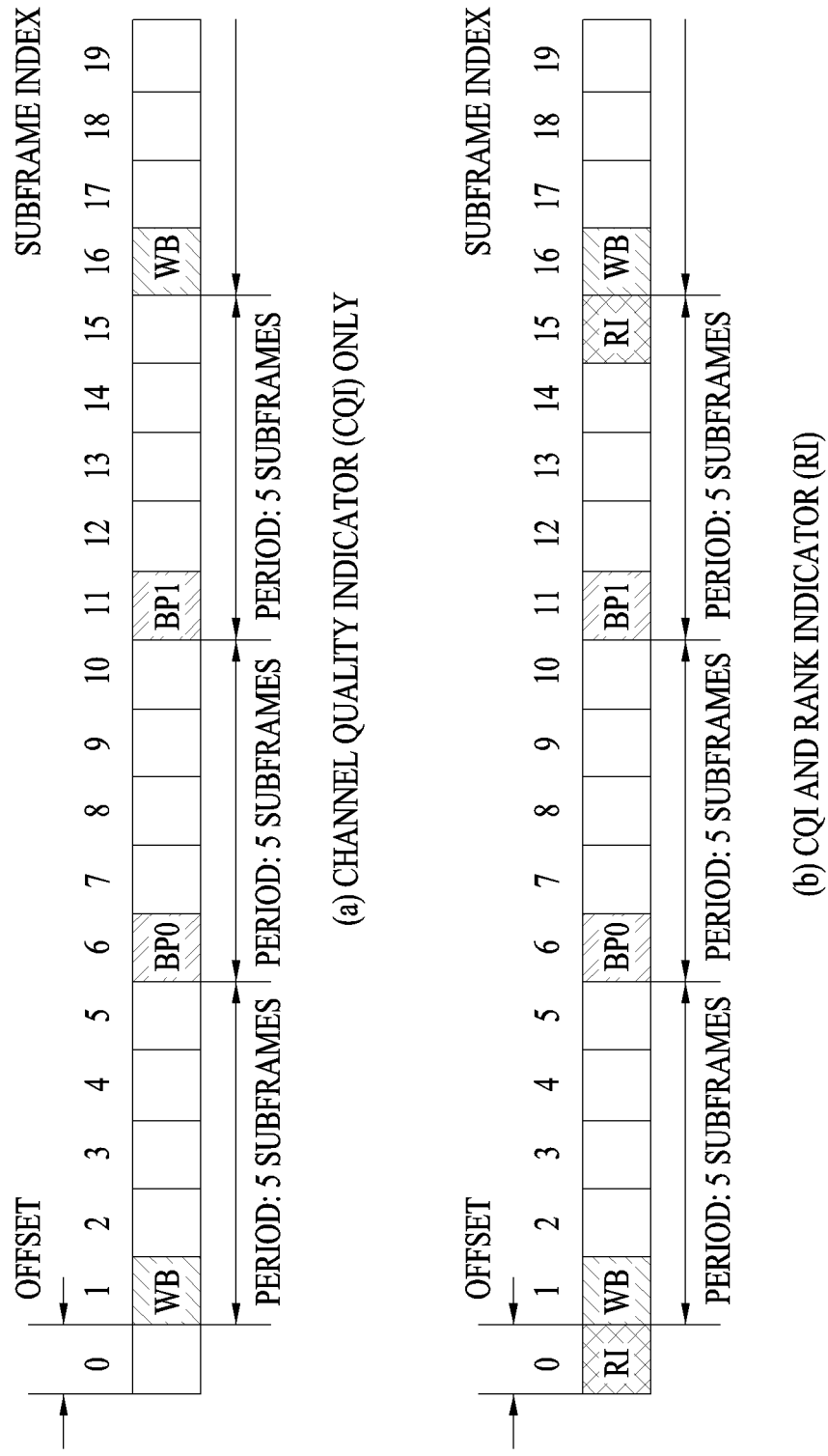

FIG. 10 illustrates a system in which a system bandwidth consists of 16 RBs. It is assumed that the system bandwidth includes two Bandwidth Parts (BPs) BP0 and BP1 each consisting of two SubBands (SBs) SB0 and SB1 and each SB includes 4 RBs. The above assumption is exemplary and the number of BPs and the size of each SB may vary with the size of the system bandwidth. The number of SBs constituting each BP may differ according to the number of RBs, the number of BPs, and the size of each SB.

In the CQI transmission type of transmitting both a WB CQI and an SB CQI, the WB CQI is transmitted in the first CQI transmission subframe and an SB CQI of the better SB state of SB0 and SB1 in BP0 is transmitted in the next CQI transmission subframe together with and an index of the corresponding SB (e.g. Subband Selection Indicator (SSI). Thereafter, an SB CQI of the better SB state of SB0 and SB1 in BP1 and an index of the corresponding SB are transmitted in the next CQI transmission subframe. Thus, CQI of each BP is sequentially transmitted after transmission of the WB CQI. The CQI of each BP may be sequentially transmitted once to four times during the interval between transmission intervals of two WB CQIs. For example, if the CQI of each BP is transmitted once during the time interval between two WB CQIs, CQIs may be transmitted in the order of WB CQI ⇒ BP0 CQI⇒ BP1 CQI⇒ WB CQI. If the CQI of each BP is transmitted four times during the time interval between two WB CQIs, CQIs may be transmitted in the order of WB CQI ⇒ BP0 CQI⇒ BP1 CQI⇒ BP0 CQI⇒ BP1 CQI⇒ BP0 CQI⇒ BP1 CQI⇒ BP0 CQI⇒ BP1 CQI⇒ WB CQI. Information as to how many times each BP CQI is transmitted is signaled by a higher layer (RRC layer).

FIG. 11(a) illustrates an example of transmitting both a WB CQI and an SB CQI when a UE receives information indicating {period '5' and offset '1'} through signaling. Referring to FIG. 11(a), a CQI may be transmitted only in subframes corresponding to the signaled period and offset regardless of type. FIG. 11(b) illustrates an example of transmitting an RI in addition to the example shown in FIG. 11(a). The RI may be signaled as a combination of a multiple of a WB CQI transmission period and an offset at the transmission period from a higher layer (e.g. RRC layer). The offset of the RI is signaled using a value relative to the offset of a CQI. For example, if the offset of the CQI is '1' and the offset of the RI is '0', the RI has the same offset as the CQI. The offset value of the RI is defined as 0 or a negative number. More specifically, it is assumed in FIG. 11(b) that, in an environment identical to that of FIG. 11(a), an RI transmission period is a multiple of 1 of the WB CQI transmission period and the RI offset is '−1'. Since the RS transmission period is a multiple of 1 of the WB CQI transmission period, the RS transmission period and the WB CQI transmission period are substantially the same. Since the offset of the RI is '−1', the RI is transmitted based upon the value '−1' (i.e. subframe index 0) relative to the offset '1' of the CQI in FIG. 11(a). If the offset of the RI is '0', the transmission subframes of the WB CQI and RI overlap. In this case, the WB CQI is dropped and the RI is transmitted.

Figure 12:
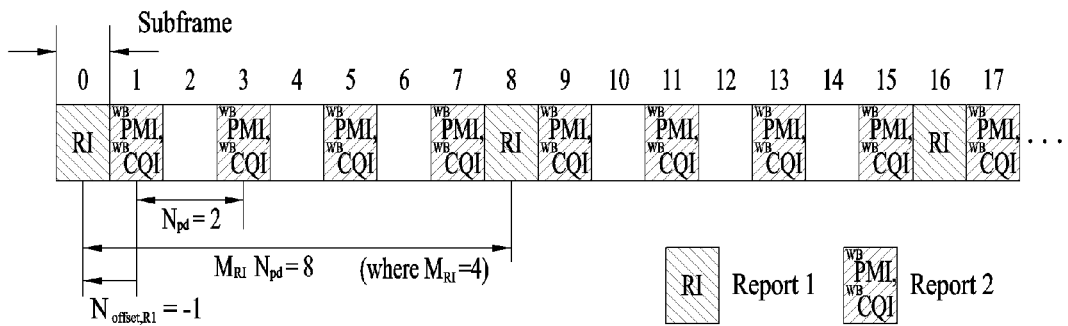
FIGS. 12 and 13 illustrate an exemplary process for periodically reporting CSI when a non-hierarchical codebook is used.

FIG. 12 illustrates CSI feedback in the case of Mode 1-1 of FIG. 8.

Referring to FIG. 12, CSI feedback is comprised of two types of report content, i.e. transmission of Report 1 and transmission of Report 2. More specifically, an RI is transmitted through Report 1 and a WB PMI and a WB CQI are transmitted through Report 2. Report 2 is transmitted in subframe indexes satisfying (10*nf+floor(ns/2)−Noffset,CQI)mod(Npd)=0. Noffset,CQI indicates an offset for PMI/CQI transmission shown in FIG. 9. In FIG. 12, Noffset,CQI=1. Npd illustrates an interval of subframes between contiguous Reports 2 and the case of Npd=2 is illustrated in FIG. 12. Report 1 is transmitted in subframe indexes satisfying (10*nf+floor(ns/2)−Noffset,CQI−Noffset,RI)mod (MRI*Npd)=0. MRI is determined by higher layer signaling. Noffset,RI denotes a relative offset value for RI transmission shown in FIG. 11. The case in which MRI=4 and Noffset,RI=−1 is illustrated in FIG. 12.

Figure 13:
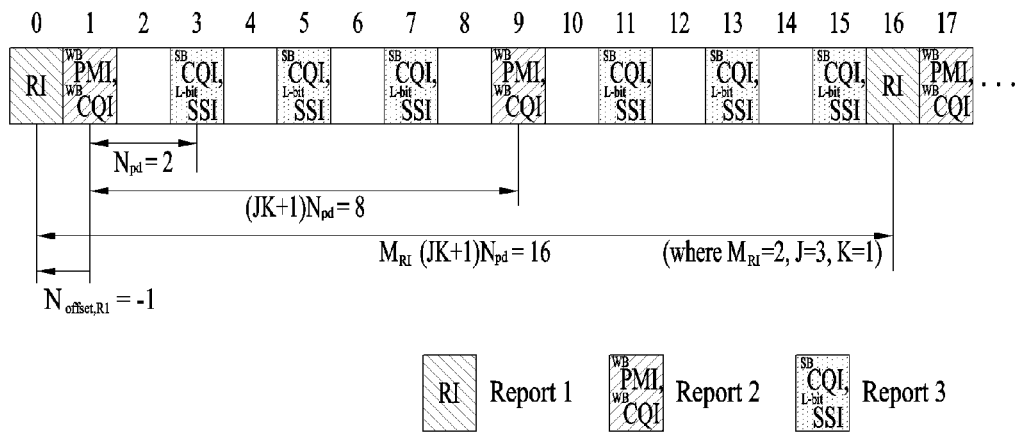

FIG. 13 illustrates CSI feedback in the case of Mode 2-1 of FIG. 8.

Referring to FIG. 13, CSI feedback is comprised of three types of report content, i.e. transmission of Report 1, transmission of Report 2, and transmission of Report 3. More specifically, an RI is transmitted through Report 1, a WB PMI and a WB CQI are transmitted through Report 2, and an SB CQI and an L-bit Subband Selection Indicator (SSI) are transmitted through Report 3. Report 2 or Report 3 is transmitted in subframe indexes satisfying (10*nf+floor(ns/2)−Noffset,CQI)mod(Npd)=0. Especially, Report 2 is transmitted in subframe indexes satisfying (10*nf+floor(ns/2)−Noffset,CQI)mod(H*Npd)=0. Accordingly, Report 2 is transmitted at an interval of H*Npd and subframes between contiguous Reports are filled with transmission of Report 3. At this time, H equals to J*K+1 wherein J is the number of BPs. K is a value indicating how many full cycles will be consecutively performed, wherein the full cycle is a cycle during which a process for selectively transmitting a subband once per different BP over all BPs. K is determined by higher layer signaling. The case in which Npd=2, J=3, and K=1 is illustrated in FIG. 13. Report 1 is transmitted in subframe indexes satisfying (10*nf+floor(ns/2)−Noff,CQI−Noffset,RI)mod(MRI*(J*K+1)*Npd)=0. The case in which MRI=2 and Noffset,RI=−1 is illustrated in FIG. 13.

FIG. 14 illustrates periodic reporting of CSI which is being discussed in LTE-A. If an eNB includes 8 Tx antennas in Mode 2-1, then a 1-bit indicator, i.e. a Precoder Type Indication (PTI) parameter, is configured and periodic reporting modes classified into two types according to the PTI value are considered. In FIG. 14, W1 and W2 illustrate hierarchical codebooks described with reference to Equations 8 and 9. If both W1 and W2 are determined, a completed type of a precoding matrix W is determined by combining W 1 and W2.

Referring to FIG. 14, in the case of periodic reporting, different contents corresponding to Report 1, Report 2, and Report 3 are reported according to different repetition periods. An RI and a 1-bit PTI value are reported through Report 1. A WB W1 (when PTI=0) or a WB W2 and a WB CQI (when PTI=1) are reported through Report 2. A WB W2 and a WB CQI (when PTI=0) or an SB W2 and an SB CQI (when PTI=1) are reported through Report 3.

Report 2 and Report 3 are transmitted in subframes (for convenience, referred to as a first subframe set) having subframe indexes satisfying (10*nf+floor(ns/2)−Noffset,CQI) mod (NC)=0 wherein Noffset,CQI is an offset value for PMI/CQI transmission shown in FIG. 9 and Nc denotes a subframe interval between contiguous Reports 2 or Reports 3. The case in which Noffset,CQI=1 and Nc=2 is illustrated in FIG. 14. The first subframe set is comprised of subframes having odd-numbered indexes. nf denotes a system frame number (or radio frame index) and ns denotes a slot index in a radio frame. floor( ) indicates the floor function and 'A mod B' indicates a remainder obtained by dividing A by B.

Report 2 is located in some subframes in the first subframe set and Report 3 is located in the other subframes. More specifically, Report 2 is located in subframes having subframe indexes satisfying (10*nf+floor(ns/2)−Noffset,CQI) mod (H*Nc)=0. Accordingly, Report 2 is transmitted at an interval of H*Nc and one or more first subframes between contiguous Reports 2 are filled with transmission of Report 3. If PTI=0, then H=M and M is determined by higher layer signaling. The case in which M=2 is illustrated in FIG. 14. If PTI=1, then H=J*K+1, K is determined by higher layer signaling, and J is the number of BPs. In FIG. 14, J=3 and K=1.

Report 1 is transmitted in subframes having subframe indexes satisfying (10*nf+floor(ns/2)−Noffset,CQI−Noffset,RI) mod (MRI*(J*K+1)*Nc)=0 wherein MRI is determined by higher layer signaling. Noffset,RI indicates a relative offset value for an RI. In FIG. 14, MRI=2 and Noffset,RI=−1. The transmission time points of Report 1 and Report 2 do not overlap because Noffset,RI=−1. When a UE calculates RI, W1, and W2, they are associated with each other. For example, W1 and W2 are calculated depending on RI and W2 is calculated depending on W1. A BS may be aware of a final W from W1 and W2 when both Report 2 and Report 3 are reported after Report 1 is reported.

8 Tx (Transmit Antenna) Codebook

A communication system such as LTE-A further applies multi-user diversity technology using multi-user MIMO (MU-MIMO). To this end, from a feedback point of view, more enhanced accuracy is required than before. This is because there is an interference channel between UEs that are multiplexed in an antenna domain of MU-MIMO, and thus the accuracy of a feedback channel largely affects another multiplexed UE as well as a UE that transmits feedback. Accordingly, in order to enhance feedback channel accuracy in LTE-A, a PMI of a 8Tx codebook may be designed to be divided into $W^{(1)}$ that is a long term and/or wideband precoder and $W^{(2)}$ that is a short term and/or sub-band precoder.

An equation for one final PMI from two-channel information is represented by multiplication of $W^{(1)}$ and $W^{(2)}$ as follows.

$$W = \text{norm}(W^{(1)}W^{(2)}) \qquad \text{[Equation 11]}$$

In [Equation 11] above, W is a precoder generated from $W^{(1)}$ and $W^{(2)}$, and UE feedbacks the information to a BS. norm(A) refers to a matrix with a norm normalized to 1 for each column of matrix A.

Detailed configurations of $W^{(1)}$ and $W^{(2)}$ in a 8Tx codebook defined in LTE are represented as follows.

$$W1(i) = \begin{bmatrix} X_i & 0 \\ 0 & X_i \end{bmatrix}, \qquad \text{[Equation 12]}$$

where $X_i$ is $Nt/2$ by $M$ matrix.

$W2(j) =$ $$\begin{bmatrix} \overbrace{e_M^k \quad e_M^l \quad \cdots \quad e_M^m}^{r \text{ columns}} \\ \alpha_j e_M^k \quad \beta_j e_M^l \quad \cdots \quad \gamma_j e_M^m \end{bmatrix} \text{ (if rank = } r\text{)},$$

where $1 \leq k, l, m \leq M$ and $k, l, m$ are integer.

The codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna. Therefore, the correlations between antennas in each group have the same linear phase increment (LPI and LPI) property and the correlation between the antenna groups is characterized by phase rotation.

Since a codebook is eventually quantized values of channels, it is necessary to design a codebook, reflecting channel characteristics corresponding to a source. For example, a rank 1 codeword satisfying [Equation 13] may reflect the aforementioned characteristics.

$$W1(i) * W2(j) = \begin{bmatrix} X_i(k) \\ \alpha_j X_i(k) \end{bmatrix} \qquad \text{[Equation 13]}$$

In [Equation 13], a codeword is expressed as an Nt×1 ($N_T$ is the number of Tx antennas) and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a Discrete Fourier Transform (DFT) matrix may be used for $X_i(k)$.

4 Tx Dual Codebook Downscaled from 8 Tx Codebook

In an LTE Rel-10 system, an 8 Tx codebook for a BS having 8 Tx antennas is defined. The above codebook is a dual codebook structure in which two codebooks are multiplied and includes $W^{(1)}$ codebook including wideband/longterm channel information and $W^{(2)}$ codebook including subband/shorter channel information. Recently, a codebook similar to the 8Tx codebook defined in the LTE Rel-10 system was proposed as one of 4Tx codebook. The proposed codebook is as follows.

The overall precoder is formed as the product of $W^{(1)}$ and $W^{(2)}$ according to [Equation 14] below.

$$W = W^{(1)}W^{(2)} \qquad \text{[Equation 14]}$$

The inner precoder $W^{(1)}$ is then selected from a first codebook $C^{(1)}$ according to [Equation 15] below.

$$C'^{(1)} = \left\{ \begin{bmatrix} \tilde{W}^{(1)} & 0 \\ 0 & \tilde{W}^{(1)} \end{bmatrix} \middle| \tilde{W}^{(1)} = \right. \qquad \text{[Equation 15]}$$

$$[w_{2k \bmod 16} \quad w_{(2k+1) \bmod 16} \quad w_{(2k+2) \bmod 16} \quad w_{(2k+3) \bmod 16}],$$

$$k = 0, 1, \ldots, 7\}$$

where $$w_n = \begin{bmatrix} 1 \\ e^{j\frac{2\pi n}{16}} \end{bmatrix},$$

$n = 0, 1, \ldots, 15$

The outer precoder $W^{(2)}$ for rank 1 transmission is selected from a second codebook $C_1^{(2)}$ according to [Equation 16] below.

$$C_1^{(2)} = \left\{ \begin{bmatrix} Y \\ a_1 Y \end{bmatrix}, \begin{bmatrix} Y \\ -a_1 Y \end{bmatrix}, \begin{bmatrix} Y \\ ja_1 Y \end{bmatrix}, \begin{bmatrix} Y \\ -ja_1 Y \end{bmatrix} \right\} \qquad \text{[Equation 16]}$$

$Y \in \{e_1, e_2, e_3, e_4\}$

Here, $e_n$ is a selection vector with all zeros except for an $n^{th}$ element where n is 1 to 4. In addition, $\alpha_n = e^{j\Phi_n}$ is satisfied and $\phi_n$ is a phase value determined by a codeword index of $C^{(1)}$ and $C_1^{(2)}$ and is responsible for compensation such that $$\begin{bmatrix} Y \\ a_1 Y \end{bmatrix}$$

has LPI property.

An outer precoder $W^{(2)}$ for rank 2 transmission is selected from the second codebook $C_2^{(2)}$.

$$C_2^2 = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\} \quad \text{[Equation 17]}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$

Here, $e_n$ is a 4-element selection vector with all zeros except for the $n^{th}$ element. In addition, $\alpha_n = e^{j\phi_n}$ is satisfied and $\phi_n$ is a phase value determined by a codeword index of $C^{(1)}$ and $C_2^{(2)}$ and is responsible for compensation such that each vector of $$\begin{bmatrix} Y_1 & Y_2 \\ a_1 Y_1 & -a_2 Y_2 \end{bmatrix}$$

has LPI property.

The rank 1 codeword of the 4Tx codebook is generated as follows. A 2×2 DFT matrix is oversampled eightfold to generate a 2×16 DFT matrix. When one of 16 vectors is selected and the selected 2×1 vector is v, v repeatedly concatenates to generate a 4×1 vector of $[v\ v]^T$. In consideration of four phase compensation values $\{1, j, -1, -j\}$ for phase compensation of a vertical antenna group and a horizontal antenna group of X-pol antennas, one of $\{[v\ a_1 v]^T, [v\ a_1 *j*v]^T, [v\ -a_1 *v]^T, [v\ -a_1 *j*v]^T\}$ is selected. If compensation is not performed using $a_1$, only eight vectors among a total of 64 rank 1 vectors have LPI property. The lower vector is multiplied by a1 to perform compensation such that codeword of $[v\ a_1 v]^T$ always has LPI property. As a result, 16 vectors among a total of 64 rank 1 vectors have LPI property. $a_1$ is determined by a function of codewords of $C^{(1)}$ and $C_2^{(2)}$.

Channel Property of ULA Antenna

The channel property of the ULA antenna may be expressed by the property of a dominant eigen vector of a channel. In general, in a correlated environment in which a gap between ULA antenna ports is narrow, the dominant eigen vector has LPI property. Since transmit antenna ports are separated at the same interval, the signal of each port has regular reception delay. That is, there is a reception time difference of Δi between a signal received from a first transmit antenna and a signal received from an $i^{th}$ transmit antenna. The reception time difference appears as a phase change of a channel such that there is a phase difference of τi between the signal received from the first transmit antenna and the signal received from the $i^{th}$ transmit antenna and the channel indicates LPI property. Accordingly, in a codebook optimized in the correlated environment in which the gap between ULA antenna ports is narrow, each codeword needs to have LPI property.

First Embodiment

The First Embodiment of the Present Invention Relates to 4 Tx Codebook of Rank 2.

The aforementioned 4Tx codebook includes a first codebook $C^{(1)}$ having a size of 3 bits and a second codebook $C^{(2)}$ having a size of 4 bits at each ran and thus has a size of a total of 7 bits (here, the second codebook is defined to be divided into $C_1^{(2)}$ and $C_2^{(2)}$ according to rank but, for convenience of description, the second codebook is $C^{(2)}$ irrespective of rank). Some of rank 1 codewords generated as the codebook have the LPI property in consideration of the ULA antenna. However, a codeword having LPI property is not present in both first and second columns among the rank 2 codewords generated as the codebook.

Accordingly, in rank 2 or more, the codebook is requested such that all beam vectors have LPI properties in order to improve a codebook performance in a high correlated ULA antenna. In addition, in order to minimize inter-stream interference, it is necessary to generate the codebook such that the beam vectors are orthonomal to each other. Hereinafter, a codebook having the following two properties in rank 2 or more will be proposed. First, all beam vectors have LPI property. Second, all beam vectors need to be orthonomal to each other.

The present invention proposes a codeword in which all beam vectors have LPI property and orthonomal property in rank 2 or more and proposes a codebook having a codeword having such a property. The 4 Tx codebook of rank 2 includes only codewords having the above properties or codewords having the above properties.

The rank 2 codeword generated based on Equations 14 to 18 is represented according to [Equation 18] below $$\begin{bmatrix} w_n & w_m \\ a_1 w_n & -a_2 w_m \end{bmatrix}, \text{ or } \begin{bmatrix} w_n & w_m \\ ja_1 w_n & -ja_2 w_m \end{bmatrix} \quad \text{[Equation 18]}$$

Here, n and m refer to arbitrary DFT vector indices selected via $C_2^{(2)}$ and each of Wn and Wm refer one vector selected from the oversampled DFT vector $$w_k = \begin{bmatrix} 1 \\ e^{j\frac{2\pi k}{16}} \end{bmatrix},$$

k=0, 1, . . . , 15.

A condition of the following equation needs to be satisfied such that all beam vectors of the rank 2 codeword of [Equation 18] have orthonomal property.

$$w_n^H w_m - \alpha_1^H \alpha_2 w_n^H w_m = 0 \quad \text{[Equation 19]}$$

In order to satisfy the above equation, $\alpha_1 = \alpha_2$ or $w_n^H w_m = 0$ needs to be satisfied.

When the condition $\alpha_1 = \alpha_2$ is satisfied such that all beam vectors have orthonomal property, a condition required to satisfy LPI property will now be described.

Under the assumption of $\alpha_1 = \alpha_2 = e^{j\Phi}$, [Equation 18] is summarized according to [Equation 20] below.

$$\begin{bmatrix} 1 & 1 \\ e^{j\frac{2\pi}{16}(n)} & e^{j\frac{2\pi}{16}(m)} \\ e^{j\phi} & -e^{j\phi} \\ e^{j\left(\frac{2\pi}{16}(n+\phi)\right)} & -e^{j\left(\frac{2\pi}{16}(n+\phi)\right)} \end{bmatrix}, \quad \text{[Equation 20]}$$

or $$\begin{bmatrix} 1 & 1 \\ e^{j\frac{2\pi}{16}(n)} & e^{j\frac{2\pi}{16}(m)} \\ je^{j\phi} & -je^{j\phi} \\ je^{j(\frac{2\pi}{16}(n+\phi))} & -je^{j(\frac{2\pi}{16}(m+\phi))} \end{bmatrix}$$

As shown in the left of [Equation 20] above, [Equation 21] needs to be satisfied such that both two vectors have LPI property.

$$\phi = 2\frac{2\pi}{16}(n) = 2\frac{2\pi}{16}(m) + \pi \pm 2\pi \quad \text{[Equation 21]}$$

m and n that satisfy [Equation 21] above satisfy n=m±4

However, if the existing codebook of [Equation 15] above is used, since |n−m|<4, it is impossible to generate a codeword having both orthonomal property and LPI property. Accordingly, in order to enable two vectors configuring the rank 2 codeword to have the LPI property, $C^{(1)}$ and $C_2^{(2)}$ need to be newly designed in the 4Tx codebook.

According to a first example of the 4 Tx codebook of rank 2, [Equation 21] above is satisfied such that all vectors have LPI property and orthonomal property is satisfied according to $\alpha_1 = \alpha_2$ among conditions based on [Equation 19] above.

$C^{(1)}$ and $C_2^{(2)}$ according to the first example of the 4 Tx codebook of rank 2 are configured according to [Equation 22] below.

[Equation 22]

$$C^{(1)} = \left\{ \begin{bmatrix} \tilde{W}^{(1)} & 0 \\ 0 & \tilde{W}^{(1)} \end{bmatrix} \middle| \begin{array}{l} \tilde{W}^{(1)} = [w_{4k\mod16} \; w_{(4k+1)\mod16} \; w_{(4k+2)\mod16} \; w_{(4k+3)\mod16} \; w_{(4k+4)\mod16} \; w_{(4k+5)\mod16} \; w_{(4k+6)\mod16} \; w_{(4k+7)\mod16}] \\ k = 0, 1, 2, 3 \end{array} \right\}$$

The inner precoder $W^{(1)}$ is selected from the first codebook $C^{(1)}$.

Here, $$w_n = \begin{bmatrix} 1 \\ e^{j\frac{2\pi n}{16}} \end{bmatrix},$$

n=0, 1, . . . , 15 is satisfied and k is a codeword index of $C^{(1)}$. In addition, $C^{(1)}(k)$ is a $k^{th}$ codeword of the codebook $C^{(1)}$.

The outer precoder $W^{(2)}$ for rank 2 transmission is selected from the second codebook $C_2^{(2)}$ of [Equation 23] below.

$$C_2^{(2)} = \left\{ \begin{bmatrix} Y_1 & Y_2 \\ a_1Y_1 & -a_2Y_2 \end{bmatrix}, \begin{bmatrix} Y_1 & Y_2 \\ ja_1Y_1 & -ja_2Y_2 \end{bmatrix} \right\} \quad \text{[Equation 23]}$$

$(Y_1, Y_2) \in \{(e_1, e_5), (e_2, e_6), (e_3, e_7), (e_4, e_8)\}$ $$C_2^{(2)} = \left\{ \begin{bmatrix} e_1 & e_5 \\ a_1e_1 & -a_2e_5 \end{bmatrix}, \begin{bmatrix} e_2 & e_6 \\ a_1e_2 & -a_2e_6 \end{bmatrix}, \right.$$

$$\begin{bmatrix} e_3 & e_7 \\ a_1e_3 & -a_2e_7 \end{bmatrix}, \begin{bmatrix} e_4 & e_8 \\ a_1e_4 & -a_2e_8 \end{bmatrix},$$

$$\begin{bmatrix} e_1 & e_5 \\ ja_1e_1 & -ja_2e_5 \end{bmatrix}, \begin{bmatrix} e_2 & e_6 \\ ja_1e_2 & -ja_2e_6 \end{bmatrix},$$

$$\left. \begin{bmatrix} e_3 & e_7 \\ ja_1e_3 & -ja_2e_7 \end{bmatrix}, \begin{bmatrix} e_4 & e_8 \\ ja_1e_4 & -ja_2e_8 \end{bmatrix} \right\}$$

Here, $e_n$ is a 4-element selection vector with all zeros except for the nth element. l is the codeword index of $C_2^{(2)}$ and l=0, 1, 2, . . . , 7. In addition, $C_2^{(2)}(l)$ is an $l^{th}$ codeword of the codebook $C_2^{(2)}$ and $$a_1 = a_2 = e^{2j\left(\frac{2\pi}{16}(4k+l\mod4)\mod16\right)}$$

is satisfied.

$C^{(1)}$ according to the first example of the 4 Tx codebook of rank 2 is generated using the same oversampled DFT vector like $C^{(1)}$ of [Equation 15] above.

However, distinguished from $C^{(1)}$ of [Equation 15] above, $C^{(1)}$ according to the first example of the 4 Tx codebook of rank 2 is composed of eight consecutive oversampled DFT vectors in order to enable two beam vectors configuring the rank 2 codeword to have the LPI property. Since $C^{(1)}$ of [Equation 15] above is composed of four consecutive oversampled DFT vectors, even if an arbitrary vector included in $C^{(1)}$ is selected using $C^{(2)}$, the two beam vectors which are finally generated do not have the LPI property. That is, in [Equation 21] above, |m−n|=4 is not satisfied.

Accordingly, $C^{(1)}$ according to the first example of the 4 Tx codebook of rank 2 is composed of a fatter matrix and the type of the DFT vector selected $C^{(1)}$ from $C^{(2)}$ via is increased. That is, in [Equation 21] above, since 0<|m−n|<7, it may be possible to find m and n that satisfy |m−n|=4. As a result, the finally generated two beam vectors have LPI attribute.

A codeword having LPI property may be generated using $C^{(1)}$ and $C^{(2)}$ according to the first example of the 4 Tx codebook of rank 2. In $C^{(2)}$, $(Y_1, Y_2)$ is limited to $(e_i, e_{i+4})$. As a result, in [Equation 21] above, |m−n|=4 is always satisfied. In addition, according to [Equation 21] for enabling all beam vector configuring rank 2 to have the orthonomal property and the LPI property, in $C_2^{(2)}$ according to the first example of the 4 Tx codebook of rank 2, $\alpha_1 = \alpha_2 = e^{j\Phi}$, where $$\phi = 2\left(\frac{2\pi}{16}n\right), n = (4k + l\mod4)\mod16$$

is set.

According to a second example of the 4 Tx codebook of rank 2, [Equation 21] above is satisfied such that all vectors have LPI property and orthonomal property is satisfied according to $\alpha_1=\alpha_2$ among conditions based on [Equation 19] above.

$C^{(1)}$ and $C_2^{(2)}$ according to the second example of the 4 Tx codebook of rank 2 are configured according to [Equation 24] below.

$$C^{(1)} = \left\{ \begin{bmatrix} \tilde{W}^{(1)} & 0 \\ 0 & \tilde{W}^{(1)} \end{bmatrix} \middle| \tilde{W}^{(1)} = [w_{2k\,mod8}\ w_{(2k+1)mod8}\ w_{(2k+2)mod8}\ w_{(2k+3)mod8}], k=0,1,2,3 \right\}$$

[Equation 24]

The inner precoder $W^{(1)}$ is selected from the first codebook $C^{(1)}$.

Here, $$w_n = \begin{bmatrix} 1 \\ e^{j\frac{2\pi n}{8}} \end{bmatrix},$$

$n=0, 1, \ldots, 7$ is satisfied and k is a codeword index of $C^{(1)}$. In addition, $C^{(1)}(k)$ is a $k^{th}$ codeword of the codebook $C^{(1)}$.

The outer precoder $W^{(2)}$ for rank 2 transmission is selected from the second codebook $C_2^{(2)}$ of [Equation 25] below.

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$ [Equation 25]

$(Y_1, Y_2) \in \{(e_1, e_3), (e_2, e_4)\}$ $$C_2^{(2)} = \left\{ \begin{bmatrix} e_1 & e_3 \\ a_1 e_1 & -a_2 e_3 \end{bmatrix}, \begin{bmatrix} e_2 & e_4 \\ a_1 e_2 & -a_2 e_4 \end{bmatrix}, \begin{bmatrix} e_1 & e_3 \\ ja_1 e_1 & -ja_2 e_3 \end{bmatrix}, \begin{bmatrix} e_2 & e_4 \\ ja_1 e_2 & -ja_2 e_4 \end{bmatrix} \right\}$$

Here, $e_n$ is a 4-element selection vector with all zeros except for the nth element. l is the codeword index of $C_2^{(2)}$ and l=0, 1, 2, 3. In addition, $C_2^{(2)}(l)$ is an $l^{th}$ codeword of the codebook $C_2^{(2)}$ and $$a_1 = a_2 = e^{2j\left(\frac{2\pi}{16}(2k+l\,mod2)mod8\right)}$$

is satisfied.

$C^{(1)}$ according to the second example of the 4 Tx codebook of rank 2 is composed of a matrix having the same size as $C^{(1)}$ of [Equation 15] above.

However, distinguished from $C^{(1)}$ of [Equation 15] above, $C^{(1)}$ according to the second example of the 4 Tx codebook of rank 2 is composed of a DFT vector oversampled fourfold instead of eightfold in order to enable two beam vectors configuring the rank 2 codeword to have the LPI property. Since $C^{(1)}$ of [Equation 15] above is composed of a DFT vector oversampled eightfold, even if an arbitrary vector included in $C^{(1)}$ is selected using $C^{(2)}$, the two beam vectors which are finally generated do not have the LPI property.

Accordingly, $C^{(1)}$ according to the second example of the 4 Tx codebook of rank 2 may be composed of a DFT vector oversampled fourfold and two beam vectors have LPI property via $C^{(2)}$.

In the first example of the 4 Tx codebook of rank 2, $C^{(2)}$ in order to enable the two beam vectors selected via $C^{(2)}$ to have the LPI property, |m−n|=4 needs to be satisfied. However, the second example of the 4 Tx codebook of rank 2 corresponds to the case in which $C^{(1)}$ includes a DFT vector oversampled eightfold. Since $C^{(1)}$ according to the second example of the 4 Tx codebook of rank 2 is composed of a DFT vector oversampled fourfold, instead of |m−n|=4, |m−n|=2 needs to be satisfied. In order to satisfy this condition, $(Y_1, Y_2) \in \{(e_1, e_3), (e_2, e_4)\}$ is set in [Equation 25] above. In addition, according to [Equation 21] for enabling all beam vectors configuring rank 2 to have the orthonomal property and the LPI property, $C^{(1)}$ according to the second example of the 4 Tx codebook of rank 2 is set according to $\alpha_1=\alpha_2=e^{j\Phi}$, where $$\phi = 2\frac{2\pi}{16}(n), n = (2k+l\,mod2)mod8.$$

According to a third example of the 4 Tx codebook of rank 2, [Equation 21] above is satisfied such that all vectors have LPI property and orthonomal property is satisfied according to $v_n^H v_m = 0$ among conditions based on [Equation 19] above.

In [Equation 19] above, when $v_n^H v_m = 0$ is satisfied, two beam vectors of rank 2 are always orthonomal with respect to arbitrary $\alpha_1, \alpha_2$. Accordingly, a codebook is designed to satisfy $v_n^H v_m = 0$ and, when $\alpha_1, \alpha_2$ are calculated such that the beam vector corresponding to each rank has LPI property, a codebook having both orthonomal property and LPI property is generated.

The codebook according to the third example of the 4 Tx codebook of rank 2 is configured according to [Equation 26] below.

$$C^{(1)} = \left\{ \begin{bmatrix} \tilde{W}^{(1)} & 0 \\ 0 & \tilde{W}^{(1)} \end{bmatrix} \middle| \tilde{W}^{(1)} = [w_{2k\,mod16}\ w_{(2k+1)mod16}\ w_{(2k+2)mod16}\ \cdots\ w_{(2k+15)mod16}], k=0 \right\}$$

[Equation 26]

The inner precoder $W^{(1)}$ is selected from the first codebook $C^{(1)}$.

Here, $$w_n = \begin{bmatrix} 1 \\ e^{j\frac{2\pi n}{16}} \end{bmatrix},$$

n=0, 1, . . . , 15 is satisfied and k is a codeword index of $C^{(1)}$. In addition, $C^{(1)}$ (k) is a $k^{th}$ codeword of the codebook $C^{(1)}$.

The outer precoder $W^{(2)}$ for rank 2 transmission is selected from the second codebook $C_2^{(2)}$ according to [Equation 27] below.

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$ [Equation 27]

$(Y_1, Y_2) \in \{(e_1, e_9), (e_2, e_{10}), (e_3, e_{11}), (e_4, e_{12}),$ $(e_5, e_{13}), (e_6, e_{14}), (e_7, e_{15}), (e_8, e_{16})\}|$ $$C_2^{(2)} = \left\{ \begin{bmatrix} e_1 & e_9 \\ a_i e_1 & -a_2 e_9 \end{bmatrix}, \begin{bmatrix} e_2 & e_{10} \\ a_1 e_2 & -a_2 e_{10} \end{bmatrix}, \right.$$

$$\begin{bmatrix} e_3 & e_{11} \\ a_1 e_3 & -a_2 e_{11} \end{bmatrix}, \begin{bmatrix} e_4 & e_{12} \\ a_1 e_4 & -a_2 e_{12} \end{bmatrix},$$

$$\begin{bmatrix} e_5 & e_{13} \\ a_1 e_5 & -a_2 e_{13} \end{bmatrix}, \begin{bmatrix} e_6 & e_{14} \\ a_1 e_6 & -a_2 e_{14} \end{bmatrix}, \begin{bmatrix} e_7 & e_{15} \\ a_1 e_7 & -a_2 e_{15} \end{bmatrix},$$

$$\begin{bmatrix} e_8 & e_{16} \\ a_1 e_8 & -a_2 e_{16} \end{bmatrix}, \begin{bmatrix} e_1 & e_9 \\ ja_1 e_1 & -ja_2 e_9 \end{bmatrix},$$

$$\begin{bmatrix} e_2 & e_{10} \\ ja_1 e_2 & -ja_2 e_{10} \end{bmatrix}, \begin{bmatrix} e_3 & e_{11} \\ ja_1 e_3 & -ja_2 e_{11} \end{bmatrix},$$

$$\begin{bmatrix} e_4 & e_{12} \\ ja_1 e_4 & -ja_2 e_{12} \end{bmatrix}, \begin{bmatrix} e_5 & e_{13} \\ ja_1 e_5 & -ja_2 e_{13} \end{bmatrix},$$

$$\begin{bmatrix} e_6 & e_{14} \\ ja_1 e_6 & -ja_2 e_{14} \end{bmatrix},$$

$$\begin{bmatrix} e_7 & e_{15} \\ ja_1 e_7 & -ja_2 e_{15} \end{bmatrix},$$

$$\left. \begin{bmatrix} e_8 & e_{16} \\ ja_1 e_8 & -ja_2 e_{16} \end{bmatrix} \right\}$$

Here, $e_n$ is a 4-element selection vector with all zeros except for the nth element. l is the codeword index of $C_2^{(2)}$ and l=0, 1, 2, . . . , 15 is satisfied. In addition, $C_2^{(2)}$ (l) is an $i^{th}$ codeword of the codebook $C_2^{(2)}$ and $$a_1 = e^{2j\left(\frac{2\pi}{16}(l\,mod\,8)\right)}, \quad a_2 = e^{2j\left(\frac{2\pi}{16}((l\,mod\,8)+8)\right)+j\pi}$$

is satisfied.

$C^{(1)}$ according to the third example of the 4 Tx codebook of rank 2 is composed of a DFT vector oversampled eight-fold and has one codeword composed of all DFT vectors.

$v_n^H v_m = 0$ in [Equation 19] is satisfied by restricting $(Y_1, Y_2) = \{(e_i, e_{i+8})\}$ of $C_2^{(2)}$ according to the third example of the 4 Tx codebook of rank 2. That is, in the rank 2 codeword generated according to Equations 26 and 27, two beam vectors are orthonomal and $\alpha_1$ and $\alpha_2$ are set according to [Equation 27] above such that each beam vector has LPI property.

Although rank 2 is assumed in the aforementioned first to third examples of the 4 Tx codebook of rank 2, the scope of the present invention is not limited to rank 2 and includes an arbitrary codebook satisfying LPI property and orthonomal property using the aforementioned method at high rank such as rank 2 or more. In addition, the case in which some of the rank 2 codebook described in the aforementioned embodiments is subsampled or an arbitrary codebook including the codebook is included in the scope of the present invention.

Hereinafter, a case in which the aforementioned condition of the 4 Tx codebook of rank 2 is satisfied and the inner precoder $W^{(1)}$ and the outer precoder $W^{(2)}$ are set to 4 bits and 1 bit, respectively will be described.

First, $W^{(1)}$ may be set according to [Equation 28] below.

$$W_1(l) = \begin{bmatrix} \tilde{W}_1(l) & 0 \\ 0 & \tilde{W}_1(l)D_a(l) \end{bmatrix},$$ [Equation 28]

$l \in \{0, 1, 2, \ldots, 15\}$

Here, $\tilde{W}_1(l)$ is set according to [Equation 29] below.

$$\tilde{W}_1(l) =$$ [Equation 29]

$[w_{(l)mod16} \; w_{(l+1)mod16} \; \cdots \; w_{(l+6)mod16} \; w_{(l+7)mod16}],$ $$w_n = \begin{bmatrix} 1 \\ e^{j\frac{2\pi n}{16}} \end{bmatrix}$$

In addition, according to [Equation 30] below, $D_a(l)$ is composed of a $p^{th}$ row and a $q^{th}$ column, where p and q are started from 0.

$$\{D_a(l)\}_{pq} = \begin{cases} e^{2j\frac{2\pi\cdot((l+(p\,mod\,4))mod16)}{16}}, & p = q \\ 0, & p \neq q \end{cases}$$ [Equation 30]

$W^{(2)}$ may be set according to the following equation.

$$W_2(n_1, n_2) = \begin{bmatrix} e_{n_1} & e_{n_2} \\ e_{n_1} & -e_{n_2} \end{bmatrix},$$

$(n_1, n_2) \in \{(1, 5), (3, 7)\}$ or $$W_2(n_1, n_2) = \begin{bmatrix} e_{n_1} & e_{n_2} \\ e_{n_1} & -e_{n_2} \end{bmatrix},$$

$(n_1, n_2) \in \{(1, 5), (2, 6)\}.$

Hereinafter, a case in which the aforementioned condition of the 4 Tx codebook of rank 2 is satisfied and the inner precoder $W^{(1)}$ and the outer precoder $W^{(2)}$ are set to 3 bits and 2 bits, respectively will be described.

First, $W^{(1)}$ may be set according to [Equation 31] below.

$$W_1(l) = \begin{bmatrix} \tilde{W}_1(l) & 0 \\ 0 & \tilde{W}_1(l)D_a(l) \end{bmatrix}, \quad [\text{Equation 31}]$$

$l \in \{0, 1, 2, \ldots, 7\}$

Here, $\tilde{W}_1(l)$ is set according to [Equation 32] below.

$$\tilde{W}_1(l) = \quad [\text{Equation 32}]$$
$$[w_{(2l)mod16} \; w_{(2l+1)mod16} \; \cdots \; w_{(2l+6)mod16} \; w_{(2l+7)mod16}],$$
$$w_n = \begin{bmatrix} 1 \\ e^{j\frac{2\pi n}{16}} \end{bmatrix}$$

In addition, according to the following equation, $D_a(l)$ is composed of a $p^{th}$ row and a $q^{th}$ column, where p and q are started from 0.

$$\{D_a(l)\}_{pq} = \begin{cases} e^{2\cdot j\frac{2\pi\cdot((2l+(p\bmod4))\bmod16)}{16}}, & p=q \\ 0, & p \neq q \end{cases} \quad [\text{Equation 33}]$$

$W^{(2)}$ may be set according to the following equation.

$$W_2(n_1, n_2) = \begin{bmatrix} e_{n_1} & e_{n_2} \\ e_{n_1} & -e_{n_2} \end{bmatrix},$$
$$(n_1, n_2) \in \{(1, 5), (2, 6), (3, 7)(4, 8)\}.$$

Hereinafter, a case in which the aforementioned condition of the 4 Tx codebook of rank 2 is satisfied and the inner precoder $W^{(1)}$ and the outer precoder $W^{(2)}$ are set to 3 bits and 1 bit, respectively will be described.

First, $W^{(1)}$ may be set according to [Equation 34] below.

$$W_1(l) = \begin{bmatrix} \tilde{W}_1(l) & 0 \\ 0 & \tilde{W}_1(l)D_a(l) \end{bmatrix}, \quad [\text{Equation 34}]$$

$l \in \{0, 1, 2, \ldots, 7\}$

Here, $\tilde{W}_1(l)$ is set according to [Equation 35] below.

$$\tilde{W}_1(l) = \quad [\text{Equation 35}]$$
$$[w_{(2l)mod16} \; w_{(2l+1)mod16} \; \cdots \; w_{(2l+6)mod16} \; w_{(2l+7)mod16}],$$
$$w_n = \begin{bmatrix} 1 \\ e^{j\frac{2\pi n}{16}} \end{bmatrix}$$

In addition, according to [Equation 36] below, $D_a(l)$ is composed of a $p^{th}$ row and a $q^{th}$ column, where p and q are started from 0.

$$\{D_a(l)\}_{pq} = \begin{cases} e^{2\cdot j\frac{2\pi\cdot((2l+(p\bmod4))\bmod16)}{16}}, & p=q \\ 0, & p \neq q \end{cases} \quad [\text{Equation 36}]$$

$W^{(2)}$ may be set according to the following equation.

$$W_2(n_1, n_2) = \begin{bmatrix} e_{n_1} & e_{n_2} \\ e_{n_1} & -e_{n_2} \end{bmatrix},$$
$$(n_1, n_2) \in \{(1, 5), (3, 7)\}$$

or $$W_2(n_1, n_2) = \begin{bmatrix} e_{n_1} & e_{n_2} \\ e_{n_1} & -e_{n_2} \end{bmatrix},$$
$$(n_1, n_2) \in \{(1, 5), (2, 6)\}.$$

Hereinafter, a case in which the aforementioned condition of the 4 Tx codebook of rank 2 is satisfied and the inner precoder $W^{(1)}$ and the outer precoder $W^{(2)}$ are set to 4 bits and 2 bits, respectively.

First, $W^{(1)}$ is set according to [Equation 37] below.

$$W_1(l) = \begin{bmatrix} \tilde{W}_1(l) & 0 \\ 0 & \tilde{W}_1(l)D_a(l) \end{bmatrix}, \quad [\text{Equation 37}]$$

$l \in \{0, 1, 2, \ldots, 15\}$

Here, $\tilde{W}_1(l)$ is set according to the following equation.

$$\tilde{W}_1(l) = \quad [\text{Equation 37}]$$
$$[w_{(2l)mod16} \; w_{(2l+1)mod16} \; \cdots \; w_{(2l+6)mod16} \; w_{(2l+7)mod16}],$$
$$w_n = \begin{bmatrix} 1 \\ e^{j\frac{2\pi n}{16}} \end{bmatrix}$$

In addition, according to the following equation, $D_a(l)$ is composed of a $p^{th}$ row and a $q^{th}$ column, where p and q are started from 0.

$$\{D_a(l)\}_{pq} = \begin{cases} e^{2\cdot j\frac{2\pi\cdot((2l+(p\bmod4))\bmod16)}{16}}, & p=q \\ 0, & p \neq q \end{cases} \quad [\text{Equation 39}]$$

$W^{(2)}$ may be set according to the following equation.

$$W_2(n_1, n_2) = \begin{bmatrix} e_{n_1} & e_{n_2} \\ e_{n_1} & -e_{n_2} \end{bmatrix},$$
$$(n_1, n_2) \in \{(1, 5), (2, 6), (3, 7)(4, 8)\}.$$

Second Embodiment

The Second Embodiment of the Present Invention Relates to 4 Tx Codebook of Rank 3 or 4.

4TX codebook of rank 3 or 4 according to the present invention may be generated by sampling a 4 Tx codebook of LTE release 8 to reduce a codebook size. In general, in a high rank environment, system performance is not sensitive to a codebook size compared with a low rank. For example, when a receiving end is not an IRC receiver, performance is not affected in a max rank even if any precoder is used. For this reason, a LTE 8 Tx codebook may be designed to remarkably reduce a codebook size in a high rank, and in rank 8, a codebook size is 0 bit. In consideration of this principle, hereinafter, a new code book generated by sampling a LTE release-8 4 Tx codebook will be described. Accordingly, a codebook size may be reduced to save feedback overhead.

The LTE release-8 4 Tx codebook may be configured by selecting rank n of column vectors in each matrix of the following equation using a predetermined method.

For example, when rank is 4, 4 Tx codebook is as follows.

First, each matrix for a BPSK modulation method of 4 TX codebook of rank 4 is as follows.

$$W_0 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad W_2 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix}$$
[Equation 40]

$$W_8 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix} \quad W_{10} = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}$$

$$W_{12} = \frac{1}{2}\begin{bmatrix} 1 & 1 & 1 & -1 \\ 1 & 1 & -1 & 1 \\ 1 & -1 & 1 & 1 \\ -1 & 1 & 1 & 1 \end{bmatrix}$$

$$W_{13} = \frac{1}{2}\begin{bmatrix} 1 & 1 & -1 & 1 \\ 1 & 1 & 1 & -1 \\ -1 & 1 & 1 & 1 \\ 1 & -1 & 1 & 1 \end{bmatrix}$$

$$W_{14} = \frac{1}{2}\begin{bmatrix} 1 & -1 & 1 & 1 \\ -1 & 1 & 1 & 1 \\ 1 & 1 & 1 & -1 \\ 1 & 1 & -1 & 1 \end{bmatrix}$$

$$W_{15} = \frac{1}{2}\begin{bmatrix} 1 & -1 & -1 & -1 \\ -1 & 1 & -1 & -1 \\ -1 & -1 & 1 & -1 \\ -1 & -1 & -1 & 1 \end{bmatrix}$$

Next, each matrix for a QPSK modulation method of 4 TX codebook of rank 4 is as follows.

$$W_1 = \frac{1}{2}\begin{bmatrix} 1 & -j & -1 & j \\ j & 1 & j & 1 \\ -1 & -j & 1 & j \\ -j & 1 & -j & 1 \end{bmatrix}$$
[Equation 41]

$$W_3 = \frac{1}{2}\begin{bmatrix} 1 & j & -1 & -j \\ -j & 1 & -j & 1 \\ -1 & j & 1 & -j \\ j & 1 & j & 1 \end{bmatrix}$$

$$W_9 = \frac{1}{2}\begin{bmatrix} 1 & -j & 1 & -j \\ j & 1 & -j & -1 \\ 1 & j & 1 & j \\ j & -1 & -j & 1 \end{bmatrix}$$

$$W_{11} = \frac{1}{2}\begin{bmatrix} 1 & j & 1 & j \\ -j & 1 & j & -1 \\ 1 & -j & 1 & -j \\ -j & -1 & j & 1 \end{bmatrix}$$

In addition, signs of imaginary numbers of each matrix of Equation 41 above may be changed according to the following equation.

$$W_1 = \frac{1}{2}\begin{bmatrix} 1 & j & -1 & -j \\ -j & 1 & -j & 1 \\ -1 & j & 1 & -j \\ j & 1 & j & 1 \end{bmatrix}$$
[Equation 42]

$$W_3 = \frac{1}{2}\begin{bmatrix} 1 & -j & -1 & j \\ j & 1 & j & 1 \\ -1 & -j & 1 & j \\ -j & 1 & -j & 1 \end{bmatrix}$$

$$W_9 = \frac{1}{2}\begin{bmatrix} 1 & j & 1 & j \\ -j & 1 & j & -1 \\ 1 & -j & 1 & -j \\ -j & -1 & j & 1 \end{bmatrix}$$

$$W_{11} = \frac{1}{2}\begin{bmatrix} 1 & -j & 1 & -j \\ j & 1 & -j & -1 \\ 1 & j & 1 & j \\ j & -1 & -j & 1 \end{bmatrix}$$

Next, each matrix for an 8PSK modulation method of 4 TX codebook of rank 4 is as follows.

$$W_4 = \frac{1}{2}\begin{bmatrix} 1 & \frac{1-j}{\sqrt{2}} & -j & \frac{-1-j}{\sqrt{2}} \\ \frac{1+j}{\sqrt{2}} & 1 & \frac{-1+j}{\sqrt{2}} & j \\ j & \frac{-1-j}{\sqrt{2}} & 1 & \frac{-1+j}{\sqrt{2}} \\ \frac{-1+j}{\sqrt{2}} & -j & \frac{-1-j}{\sqrt{2}} & 1 \end{bmatrix}$$
[Equation 43]

$$W_7 = \frac{1}{2}\begin{bmatrix} 1 & \frac{1+j}{\sqrt{2}} & j & \frac{-1+j}{\sqrt{2}} \\ \frac{1-j}{\sqrt{2}} & 1 & \frac{-1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix}$$

$$W_5 = \frac{1}{2}\begin{bmatrix} 1 & \frac{-1-j}{\sqrt{2}} & j & \frac{1-j}{\sqrt{2}} \\ \frac{-1+j}{\sqrt{2}} & 1 & \frac{1+j}{\sqrt{2}} & -j \\ -j & \frac{1-j}{\sqrt{2}} & 1 & \frac{1+j}{\sqrt{2}} \\ \frac{1+j}{\sqrt{2}} & j & \frac{1-j}{\sqrt{2}} & 1 \end{bmatrix}$$

$$W_6 = \frac{1}{2}\begin{bmatrix} 1 & \frac{-1+j}{\sqrt{2}} & j & \frac{-1+j}{\sqrt{2}} \\ \frac{-1-j}{\sqrt{2}} & 1 & \frac{1-j}{\sqrt{2}} & j \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix}$$

In addition, signs of imaginary numbers of each matrix of Equation 43 above may be changed according to the following equation.

$$W_4 = \frac{1}{2}\begin{bmatrix} 1 & \frac{1+j}{\sqrt{2}} & -j & \frac{-1+j}{\sqrt{2}} \\ \frac{1-j}{\sqrt{2}} & 1 & \frac{-1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix}$$ [Equation 44]

$$W_7 = \frac{1}{2}\begin{bmatrix} 1 & \frac{1-j}{\sqrt{2}} & -j & \frac{-1-j}{\sqrt{2}} \\ \frac{1+j}{\sqrt{2}} & 1 & \frac{-1+j}{\sqrt{2}} & j \\ j & \frac{-1-j}{\sqrt{2}} & 1 & \frac{-1+j}{\sqrt{2}} \\ \frac{-1+j}{\sqrt{2}} & -j & \frac{-1-j}{\sqrt{2}} & 1 \end{bmatrix}$$

$$W_5 = \frac{1}{2}\begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & j \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix}$$

$$W_6 = \frac{1}{2}\begin{bmatrix} 1 & \frac{-1-j}{\sqrt{2}} & j & \frac{1-j}{\sqrt{2}} \\ \frac{-1+j}{\sqrt{2}} & 1 & \frac{1+j}{\sqrt{2}} & -j \\ -j & \frac{1-j}{\sqrt{2}} & 1 & \frac{1+j}{\sqrt{2}} \\ \frac{1+j}{\sqrt{2}} & j & \frac{1-j}{\sqrt{2}} & 1 \end{bmatrix}$$

As another example, when a rank is 3, three column vectors may be selected in the aforementioned 4 TX codebook of rank 4 using a predetermined method and 1/?? instead of 1/2 of a front part of a matrix may be multiplied for normalization. In detail, when a rank is 3, the 4 TX codebook is as follows.

First, each matrix for a BPSK modulation method of 4 TX codebook of rank 3 is as follows.

$$W_0 = \frac{1}{\sqrt{3}}\begin{bmatrix} 1 & 1 & 1 \\ 1 & 1 & -1 \\ 1 & -1 & -1 \\ 1 & -1 & 1 \end{bmatrix}$$ [Equation 44]

$$W_2 = \frac{1}{\sqrt{3}}\begin{bmatrix} 1 & -1 & 1 \\ -1 & 1 & 1 \\ 1 & 1 & 1 \\ -1 & -1 & 1 \end{bmatrix}$$

$$W_8 = \frac{1}{\sqrt{3}}\begin{bmatrix} 1 & 1 & -1 \\ 1 & 1 & 1 \\ -1 & 1 & -1 \\ -1 & 1 & 1 \end{bmatrix}$$

$$W_{10} = \frac{1}{\sqrt{3}}\begin{bmatrix} 1 & -1 & -1 \\ -1 & 1 & -1 \\ -1 & -1 & 1 \\ 1 & 1 & 1 \end{bmatrix}$$

$$W_{12} = \frac{1}{\sqrt{3}}\begin{bmatrix} 1 & 1 & 1 \\ 1 & 1 & -1 \\ 1 & -1 & 1 \\ -1 & 1 & 1 \end{bmatrix}$$

$$W_{13} = \frac{1}{\sqrt{3}}\begin{bmatrix} 1 & 1 & -1 \\ 1 & 1 & 1 \\ -1 & 1 & 1 \\ 1 & -1 & 1 \end{bmatrix}$$

$$W_{14} = \frac{1}{\sqrt{3}}\begin{bmatrix} 1 & -1 & 1 \\ -1 & 1 & 1 \\ 1 & 1 & 1 \\ 1 & 1 & -1 \end{bmatrix}$$

$$W_{15} = \frac{1}{\sqrt{3}}\begin{bmatrix} 1 & -1 & -1 \\ -1 & 1 & -1 \\ -1 & -1 & 1 \\ -1 & -1 & -1 \end{bmatrix}$$

Next, each matrix for a QPSK modulation method of 4 TX codebook of rank 3 is as follows.

$$W_1 = \frac{1}{\sqrt{3}}\begin{bmatrix} 1 & -j & -1 \\ j & 1 & j \\ -1 & -j & 1 \\ -j & 1 & -j \end{bmatrix}$$

$$W_3 = \frac{1}{\sqrt{3}}\begin{bmatrix} 1 & j & -1 \\ -j & 1 & -j \\ -1 & j & 1 \\ j & 1 & j \end{bmatrix}$$

$$W_9 = \frac{1}{\sqrt{3}}\begin{bmatrix} 1 & 1 & -j \\ j & -j & -1 \\ 1 & 1 & j \\ j & -j & 1 \end{bmatrix}$$

$$W_{11} = \frac{1}{\sqrt{3}}\begin{bmatrix} 1 & 1 & j \\ -j & j & -1 \\ 1 & 1 & -j \\ -j & j & 1 \end{bmatrix}$$

Next, each matrix for an 8PSK modulation method of 4 TX codebook of rank 3 is as follows

[Equation 46]

$$W_4 = \frac{1}{\sqrt{3}}\begin{bmatrix} 1 & \frac{1-j}{\sqrt{2}} & \frac{-1-j}{\sqrt{2}} \\ \frac{1+j}{\sqrt{2}} & 1 & j \\ j & \frac{-1-j}{\sqrt{2}} & \frac{-1+j}{\sqrt{2}} \\ \frac{-1+j}{\sqrt{2}} & -j & 1 \end{bmatrix}$$

$$W_7 = \frac{1}{\sqrt{3}}\begin{bmatrix} 1 & j & \frac{-1+j}{\sqrt{2}} \\ \frac{1-j}{\sqrt{2}} & \frac{-1-j}{\sqrt{2}} & -j \\ -j & 1 & \frac{-1-j}{\sqrt{2}} \\ \frac{-1-j}{\sqrt{2}} & \frac{-1+j}{\sqrt{2}} & 1 \end{bmatrix}$$

$$W_5 = \frac{1}{\sqrt{3}}\begin{bmatrix} 1 & \frac{-1-j}{\sqrt{2}} & \frac{1-j}{\sqrt{2}} \\ \frac{-1+j}{\sqrt{2}} & 1 & -j \\ -j & \frac{1-j}{\sqrt{2}} & \frac{1+j}{\sqrt{2}} \\ \frac{1+j}{\sqrt{2}} & j & 1 \end{bmatrix}$$

[Equation 45]

$$W_6 = \frac{1}{\sqrt{3}}\begin{bmatrix} 1 & -j & \frac{1+j}{\sqrt{2}} \\ \frac{-1-j}{\sqrt{2}} & \frac{1-j}{\sqrt{2}} & j \\ j & 1 & \frac{1-j}{\sqrt{2}} \\ \frac{1-j}{\sqrt{2}} & \frac{1+j}{\sqrt{2}} & 1 \end{bmatrix}$$

As a first principle for sampling 4Tx codebook of rank 3 or 4, an alphabet constituting each codeword is considered. A matrix for the BPSK modulation method has only a real number, but a QPSK or 8PSK matrix also has an imaginary number. When a UE is embodied, since computational load is increased due to the imaginary values, it is advantageous to design a codebook configured with values of the BPSK matrix.

As a second principle for sampling a codebook, channel properties in a high rank is considered. Since X-pol and ULA antennas have different channel properties, it is optimum to use different codebooks dedicated to the respective antenna configurations. However, as described above, since performance is not affected by a codebook in a high rank compared with a low rank, one codebook may be used in terms of complexity.

As a third principle for sampling a codebook, the channel property of the X-pol antenna is considered. A codebook for generation of one codebook that is appropriately operated in both X-pol and ULA need to appropriately reflect the channel properties of both antenna configurations. As described above, in terms of ULA, a column vector indicating each beam may have linear phase increase attributes. However, in ULA with a narrow antenna interval, the probability that a high rank occurs is reduced, and in ULA with a wide antenna interval, the probability that a singular vector of a channel does not have linear phase increase attributes is high, and thus it is not appropriate to maintain the linear phase increase attributes of a codebook in a high rank. Accordingly, it may be appropriate to design a more optimum codebook compared with the X-pol channel. As described above, the X-pol channel is configured in such a way that channels of a horizontal antenna and a vertical antenna have the same value and a phase difference between the two antennas is present. Accordingly, in a release-8 codebook, it may be appropriate to select a codebook with this configuration maintained.

In consideration of the three above principles, hereinafter, a codebook for rank 3 or 4 configured with 1 bit, 2 bits, or 3 bits is proposed.

First, the codebook for rank 3 or 4 configured with 1 bit may be configured as follows.

The 1-bit codebook may be configured with only $W_0$ and $W_2$ in Equation 40. Release-8 method may be applied to permutation of a column vector and selection of a column vector for each rank without changes.

The 1-bit codebook is configured with BPSK values according to the first principle and is commonly applied to all antenna configurations according to the second principle, and satisfies a channel configuration of the X-pol according to the third principle.

Next, a codebook for rank 3 or 4 of 2 bits may be configured as follows.

The 2-bit codebook according to the present invention may be configured with only $W_0$, $W_2$, $W_8$, and $W_{10}$ in Equations 40 to 46.

For example, a codebook index of 0, 2, 8, and 10 may be induced by applying a second PMI index $I_{PMI2}$ having one of 0 to 3 to the following equation.

$$2I_{PMI2} + 4 \cdot \lfloor I_{PMI2}/2 \rfloor \qquad \text{[Equation 47]}$$

As described above, the release-8 method may be applied to permutation of a column vector and selection of a column vector for each rank without changes.

The 2-bit codebook is configured with BPSK values according to the first principle and is commonly applied to all antenna configurations according to the second principle, and satisfies a channel configuration of the X-pol according to the third principle.

As another example, the 2-bit codebook for rank 3 or 4 may be configured with only $W_1$, $W_3$, $W_9$, and $W_{11}$ in Equations 40 to 46. The release-8 method may be applied to permutation of a column vector and selection of a column vector for each rank without changes. The codebook is configured with the aforementioned QPSK values, is commonly applied to all antenna configurations according to the second principle, and satisfies a channel configuration of the X-pol according to the third principle.

As another example, the 2-bit codebook for rank 3 or 4 may be configured with only $W_4$, $W_5$, $W_6$, and $W_7$ in Equations 40 to 46. The release-8 method may be applied to permutation of a column vector and selection of a column vector for each rank without changes. The codebook is configured with 8PSK values, is commonly applied to all antenna configurations according to the second principle, and satisfies a channel configuration of the X-pol according to the third principle.

Next, a codebook for rank 3 or 4 of 3 bits may be configured as follows.

The 3-bit codebook may be configured with only $W_0$, $W_2$, $W_8$, $W_{10}$, $W_{12}$, $W_{13}$, $W_{14}$, and $W_{15}$ in Equations 40 to 46. The release-8 method may be applied to permutation of a column vector and selection of a column vector for each rank without changes.

The 3-bit codebook is configured with BPSK values according to the first principle and is commonly applied to all antenna configurations according to the second principle. However, $W_{12}$, $W_{13}$, $W_{14}$, and $W_{15}$ do not satisfy the channel configuration of the X-pol, and thus the third principle is not satisfied.

As another example, a 3-bit codebook may be configured with only $W_0$, $W_2$, $W_8$, $W_{10}$, $W_1$, $W_3$, $W_9$, and $W_{11}$ in Equations 40 to 46. The release-8 method may be applied to permutation of a column vector and selection of a column vector for each rank without changes. The codebook does not satisfy the first principle. However, the codebook is commonly applied to all antenna configurations according to the second principle and satisfies the channel configuration of the X-pol according to the third principle.

As another example, a 3-bit codebook may be configured with only $W_0$, $W_2$, $W_8$, $W_{10}$, $W_4$, $W_5$, $W_6$, and $W_7$ in Equations 40 to 46. The release-8 method may be applied to permutation of a column vector and selection of a column vector for each rank without changes. The codebook does not satisfy the first principle. However, the codebook is commonly applied to all antenna configurations according to the second principle and satisfy the channel configuration of the X-pol.

Next, as a 0-bit codebook, although rank 3 uses the aforementioned codebook, a codebook may not be formed with respect to rank 4. That is, the rank 4 codebook is fixed to a 4 by 4 identity matrix.

Third Embodiment

The Third Embodiment of the Present Invention Relates to a Codebook Subsampling Method According to a PUCCH Feedback Mode in the Case of Rank 3 or 4.

LTE release-12 has discussed introduction of an enhanced 4 Tx codebook compared with a legacy codebook. Hereinafter, the present invention proposes codebook subsampling of PUCCH feedback modes 1-1 and 2-1 when a new codebook having $W_1$ and $W_2$ dual codebook structures is introduced with respect to ranks 1 and 2 and a legacy release-8 codebook is used with respect to ranks 3 and 4.

First, the PUCCH feedback mode 1-1 includes submodes A and B when the dual codebook structure is used.

FIG. 15 is a diagram illustrating an example of the submode A of the PUCCH feedback mode 1-1.

Referring to FIG. 15, wideband W2 and wideband CQI are set to offset 1 and periodicity 2 and RI and W1 are set to offset 0 and periodicity 16.

In the 8Tx codebook, as shown in Table 1 below, RI and W1 are joint-encoded in 5 bits and in this case, and W1 is subsampled as follows in order to reduce the sizes of payloads of RI and W1 to report information with a low coding rate. Since RI is referred to by the remaining PMI and CQI, encoding needs to be performed with a low coding rate in order to prevent a decoding error in RI from occurring.

TABLE 1

| hypotheses | RI | values |
|---|---|---|
| 0-7 | 1 | {0, 2, 4, 6, 8, 10, 12, 14} |
| 8-15 | 2 | {0, 2, 4, 6, 8, 10, 12, 14} |
| 16-17 | 3 | {0, 2} |
| 18-19 | 4 | {0, 2} |
| 20-21 | 5 | {0, 2} |
| 22-23 | 6 | {0, 2} |
| 24-25 | 7 | {0, 2} |
| 26 | 8 | {0} |
| 27-31 | reserved | NA |

When LTEA release-12 introduces a 4Tx dual codebook with respect to ranks 1 and 2 and uses a legacy release-8 4Tx codebook with respect to ranks 3 and 4, the subsampled W1 and RI may be joint-encoded to be encoded in 5 bits or less, similarly to the case of 8Tx. For example, a codebook may be subsampled in 3 bits with respect to ranks 3 and 4 according to one of Tables 2 to 4 below.

TABLE 2

| hypotheses | RI | W1 values |
|---|---|---|
| 0 – k | 1 | To Be Determined |
| (k + 1) – n | 2 | To Be Determined |
| (n + 1) – (n + 8) | 3 | {0, 2, 8, 10, 12, 13, 14, 15} |
| (n + 9) – (n + 16) | 4 | {0, 2, 8, 10, 12, 13, 14, 15} |

TABLE 3

| hypotheses | RI | W1 values |
|---|---|---|
| 0 – k | 1 | To Be Determined |
| (k + 1) – n | 2 | To Be Determined |

TABLE 3-continued

| hypotheses | RI | W1 values |
|---|---|---|
| (n + 1) – (n + 8) | 3 | {0, 2, 8, 10, 1, 3, 9, 11} |
| (n + 9) – (n + 16) | 4 | {0, 2, 8, 10, 1, 3, 9, 11} |

TABLE 4

| hypotheses | RI | W1 values |
|---|---|---|
| 0 – k | 1 | To Be Determined |
| (k + 1) – n | 2 | To Be Determined |
| (n + 1) – (n + 8) | 3 | {0, 2, 8, 10, 4, 5, 6, 7} |
| (n + 9) – (n + 16) | 4 | {0, 2, 8, 10, 4, 5, 6, 7} |

One of Tables 2 to 4 above may be configured via a subsampling method with respect to ranks 3 and 4. That is, a 3-bit codebook that is subsampled from a release-8 codebook according to the aforementioned principle for subsampling a codebook may be applied to PUCCH feedback mode 1-1 in the same way.

In Mode 1-1, W2 of ranks 3 and 4 is not transmitted. That is, only W1 is present as PMI with respect to ranks 3 and 4. In Tables 2 to 4 above, "To Be Determined" of ranks 1 and 2 may be determined as {0, 2, 4, 6, 8, 10, 12, 14} like in the case of 8Tx, and in this case, k and n are 7 and 15, respectively.

When a dual codebook structure is used, PUCCH feedback mode 2-1 may be defined via two methods according to a PTI value. FIG. 16 illustrates PUCCH feedback mode 2-1 according to a PTI value. A wideband W1 is present with periodicity of 8 subframes in PUCCH feedback resource with offset 1 and periodicity 2 and a wideband W2 and CQI are present in the remaining resource. RI and PTI are set with periodicity 16 and offset 0. When PTI is set to 1, L-bit information indicating subband W2 and subband CQI, and a subband index is reported as shown in FIG. 16.

When the L-bit information indicating subband W2 and subband CQI, and a subband index is reported in a 8Tx codebook, W2 is subsampled as shown in Table 5 below. Information may be transmitted in 11 bits as a size of a payload of PUCCH format 2 through the subsampling method.

TABLE 5

| | Relationship between the second PMI value and codebook index $i_2$ | |
|---|---|---|
| RI | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

When LTEA release-12 introduces a 4Tx dual codebook with respect to ranks 1 and 2 and uses a legacy release-8 4Tx codebook with respect to ranks 3 and 4, W2 needs to be subsampled similarly to the case of 8Tx so as not to exceed the size of a payload of PUCCH format 2. With respect to ranks 3 and 4, CQI is 7 bits and L is a maximum of 2 bits, and thus W2 is subsampled in 2 bits as follows. That is, subsampling may be performed with respect to ranks 3 and 4 according to one of Tables 6 to 8 below.

TABLE 6

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {0, 2, 8, 10} |
| 4 | {0, 2, 8, 10} |

TABLE 7

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {1, 3, 9, 11} |
| 4 | {1, 3, 9, 11} |

TABLE 8

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {4, 5, 6, 7} |
| 4 | {4, 5, 6, 7} |

One of Tables 6 to 8 above may be configured via a subsampling method with respect to ranks 3 and 4. That is, a 2-bit codebook that is subsampled from a release-8 codebook according to the aforementioned principle for subsampling a codebook may be applied to PUCCH feedback mode 2-1 in the same way.

In Mode 2-1, W1 of ranks 3 and 4 is not transmitted. That is, only W2 is present as PMI with respect to ranks 3 and 4. In Tables 6 to 8 above, "To Be Determined" of rank 2 may be determined as {0, 2, 4, 6, 8, 10, 12, 14} like in the case of 8Tx, and in this case, n is 23.

Fourth Embodiment

A fourth embodiment of the present invention relates to a codebook subsampling method when a new codebook having $W_1$ and $W_2$ dual codebook structures with respect to ranks 1 and 2 are introduced.

First, codebook $W_1$ for ranks 1 and 2 may be set as follows.

$$W_1 = \begin{bmatrix} X_n & 0 \\ 0 & X_n \end{bmatrix}, \quad \text{[Equation 48]}$$

$$n = 0, 1, \ldots, 15$$

$$X_n = \begin{bmatrix} 1 & 1 & 1 & 1 \\ q_1^{(n) \bmod 16} & q_1^{(n+1) \bmod 16} & q_1^{(n+2) \bmod 16} & q_1^{(n+3) \bmod 16} \end{bmatrix}$$

$$q_1 = \exp(j2\pi/16)$$

Then codebook $W_2$ for ranks 1 and 2 may be set as follows.

$$W_2 \in C_2 = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\} \quad \text{[Equation 49]}$$

$$Y \in \{\tilde{e}_1, \tilde{e}_2, \tilde{e}_3, \tilde{e}_4\}$$

Here, $\tilde{e}_n$ is a 4×1 selection vector with all zeros except for the $n^{th}$ element with 1.

That is, $C_2$ for rank 1 includes 16 vectors according to the following equation below and a codeword index is conformable to an order of the following equation. That is, in the following equation, a first vector has an index 0 and is indexed in an ascending order.

$$C_2 \in \left\{ \begin{bmatrix} \tilde{e}_1 \\ \tilde{e}_1 \end{bmatrix}, \begin{bmatrix} \tilde{e}_1 \\ j\tilde{e}_1 \end{bmatrix}, \begin{bmatrix} \tilde{e}_1 \\ -\tilde{e}_1 \end{bmatrix}, \begin{bmatrix} \tilde{e}_1 \\ -j\tilde{e}_1 \end{bmatrix}, \begin{bmatrix} \tilde{e}_2 \\ \tilde{e}_2 \end{bmatrix}, \begin{bmatrix} \tilde{e}_2 \\ j\tilde{e}_2 \end{bmatrix}, \begin{bmatrix} \tilde{e}_2 \\ -\tilde{e}_2 \end{bmatrix}, \begin{bmatrix} \tilde{e}_2 \\ -j\tilde{e}_2 \end{bmatrix}, \begin{bmatrix} \tilde{e}_3 \\ \tilde{e}_3 \end{bmatrix}, \begin{bmatrix} \tilde{e}_3 \\ j\tilde{e}_3 \end{bmatrix}, \begin{bmatrix} \tilde{e}_3 \\ -\tilde{e}_3 \end{bmatrix}, \begin{bmatrix} \tilde{e}_3 \\ -j\tilde{e}_3 \end{bmatrix}, \begin{bmatrix} \tilde{e}_4 \\ \tilde{e}_4 \end{bmatrix}, \begin{bmatrix} \tilde{e}_4 \\ j\tilde{e}_4 \end{bmatrix}, \begin{bmatrix} \tilde{e}_4 \\ -\tilde{e}_4 \end{bmatrix}, \begin{bmatrix} \tilde{e}_4 \\ -j\tilde{e}_4 \end{bmatrix} \right\}$$

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

$(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$

[Equation 50]

That is, $C_2$ for rank 2 includes 16 vectors according to the following table and a codeword index is conformable to an order of the following table. That is, in the following table, a first vector has index 0 and is indexed in an ascending order.

TABLE 9

| W2 index of rank 2 | |
|---|---|
| 0 | $\begin{bmatrix} \tilde{e}_1 & \tilde{e}_1 \\ \tilde{e}_1 & -\tilde{e}_1 \end{bmatrix}$ |
| 1 | $\begin{bmatrix} \tilde{e}_1 & \tilde{e}_1 \\ j\tilde{e}_1 & -j\tilde{e}_1 \end{bmatrix}$ |
| 2 | $\begin{bmatrix} \tilde{e}_2 & \tilde{e}_2 \\ \tilde{e}_2 & -\tilde{e}_2 \end{bmatrix}$ |
| 3 | $\begin{bmatrix} \tilde{e}_2 & \tilde{e}_2 \\ j\tilde{e}_2 & -j\tilde{e}_2 \end{bmatrix}$ |
| 4 | $\begin{bmatrix} \tilde{e}_3 & \tilde{e}_3 \\ \tilde{e}_3 & -\tilde{e}_3 \end{bmatrix}$ |
| 5 | $\begin{bmatrix} \tilde{e}_3 & \tilde{e}_3 \\ j\tilde{e}_3 & -j\tilde{e}_3 \end{bmatrix}$ |
| 6 | $\begin{bmatrix} \tilde{e}_4 & \tilde{e}_4 \\ \tilde{e}_4 & -\tilde{e}_4 \end{bmatrix}$ |
| 7 | $\begin{bmatrix} \tilde{e}_4 & \tilde{e}_4 \\ j\tilde{e}_4 & -j\tilde{e}_4 \end{bmatrix}$ |
| 8 | $\begin{bmatrix} \tilde{e}_1 & \tilde{e}_2 \\ \tilde{e}_1 & -\tilde{e}_2 \end{bmatrix}$ |
| 9 | $\begin{bmatrix} \tilde{e}_1 & \tilde{e}_2 \\ j\tilde{e}_1 & -j\tilde{e}_2 \end{bmatrix}$ |
| 10 | $\begin{bmatrix} \tilde{e}_2 & \tilde{e}_3 \\ \tilde{e}_2 & -\tilde{e}_3 \end{bmatrix}$ |

TABLE 9-continued

| W2 index of rank 2 | |
|---|---|
| 11 | $\begin{bmatrix} \tilde{e}_2 & \tilde{e}_3 \\ j\tilde{e}_2 & -j\tilde{e}_3 \end{bmatrix}$ |

TABLE 9-continued

| W2 index of rank 2 | |
|---|---|
| 12 | $\begin{bmatrix} \tilde{e}_1 & \tilde{e}_4 \\ \tilde{e}_1 & -\tilde{e}_4 \end{bmatrix}$ |
| 13 | $\begin{bmatrix} \tilde{e}_1 & \tilde{e}_4 \\ j\tilde{e}_1 & -j\tilde{e}_4 \end{bmatrix}$ |
| 14 | $\begin{bmatrix} \tilde{e}_2 & \tilde{e}_4 \\ \tilde{e}_2 & -\tilde{e}_4 \end{bmatrix}$ |
| 15 | $\begin{bmatrix} \tilde{e}_2 & \tilde{e}_4 \\ j\tilde{e}_2 & -j\tilde{e}_4 \end{bmatrix}$ |

When PUCCH feedback mode 1-1 uses a dual codebook structure, submodes A and B are present. FIG. 17 illustrates a submode B when the new codebook is applied.

Referring to FIG. 17, wideband W1/W2 and wideband CQI are set to offset 1 and periodicity 2 and RI and W1 are set to offset 0 and periodicity 16.

In the 8Tx codebook, as shown in Table 10 below, W1 and W2 are subsampled to wideband W1/W2 and wideband CQI.

TABLE 10

| | PMI for W1 | | PMI for W2 | | total |
|---|---|---|---|---|---|
| RI | #bits | values | #bits | values | #bits |
| 1 | 3 | {0, 2, 4, 6, 8, 10, 12, 14}, | 1 | {0, 2} | 4 |
| 2 | 3 | {0, 2, 4, 6, 8, 10, 12, 14} | 1 | {0, 1} | 4 |
| 3 | 1 | {0, 2} | 3 | {0, 1, 2, 3, 8, 9, 10, 11} | 4 |
| 4 | 1 | {0, 1} | 3 | {0, 1, 2, 3, 4, 5, 6, 7} | 4 |
| 5 | 2 | {0, 1, 2, 3} | 0 | {0} | 2 |
| 6 | 2 | {0, 1, 2, 3} | 0 | {0} | 2 |
| 7 | 2 | {0, 1, 2, 3} | 0 | {0} | 2 |
| 8 | 0 | {0} | 0 | {0} | 0 |

8Tx W1 of ranks 1 and 2 is defined as shown in the following equation. That is, it PMI and $(i+_1)$ PMI share two overlapped DFT vectors. As such, two DFT vectors may be overlapped between adjacent PMIs so as to more accurately feedback a channel. However, in consideration of a limited PUCCH resource, PMI of even-numbered W1 may be limited to an even number so as to be subsumed. Overlapped DFT vectors are not present between even-numbered PMIs but a UE can still represent a total of 32 DFT vectors using W1 so as to minimize performance degradation.

$$B = [b_0 \ b_1 \ \ldots \ b_{31}],$$ [Equation 50]

$$[B]_{1+m,1+n} = e^{j\frac{2\pi mn}{32}},$$

$$m = 0, 1, 2, 3,$$

$$n = 0, 1, \ldots, 31$$

$$X^{(k)} \in =$$

$$\{[b_{2k \bmod 32} \ b_{(2k+1) \bmod 32} \ b_{(2k+2) \bmod 32} \ b_{(2k+3) \bmod 32}]:$$

$$k = 0, 1, \ldots, 15\}$$

$$W_1^{(k)} = \begin{bmatrix} X^{(k)} & 0 \\ 0 & X^{(k)} \end{bmatrix}$$

Codebook 1: $C_1 = \{W_1^{(0)}, W_1^{(1)}, W_1^{(2)}, \ldots, W_1^{(15)}\}$

Similarly to 8 Tx codebook subsampling, a new 4Tx codebook also requires subsampling and may be subsampled with respect to ranks 1 and 2 as shown in the following table.

TABLE 11

| | PMI for W1 | | PMI for W2 | | total |
|---|---|---|---|---|---|
| RI | #bits | values | #bits | values | #bits |
| 1 | 2 | {0, 4, 8, 12} | 2 | {0, 2, k1, k2} | 4 |
| 2 | 2 | {0, 4, 8, 12} | 2 | {k3, k4, k5, k6} | 4 |

First, W1 subsampling of 4 Tx codebook will be described below.

W1 subsampling of 4 Tx codebook may be performed similarly to W1 subsampling in 8Tx codebook. In the above table, with regard to W1, $i^{th}$ PMI and $(i+1)^{th}$ PMI share three overlapped DFT vectors. In addition, $i^{th}$ PMI and $(i+2)^{th}$ PMI share two overlapped DFT vectors and $i^{th}$ PMI and $(i+3)^{th}$ PMI share one overlapped DFT vector.

That is, in consideration of a limited PUCCH resource, PMI of W1 except for overlapped PMI may be subsampled to {0, 4, 8, 12}. Overlapped DFT vectors are not present between the subsampled PMIs, a UE can still represent a total of 16 DFT vectors using W1 so as to minimize performance degradation.

Next, W2 subsampling of 4 Tx codebook in the case of rank 1 will be described below.

In the case of rank 1, W2 subsampling of 4 Tx codebook may be embodied in various ways according to configurations of indexes k1, k2, k3, k4, k5, and k6.

In rank 1, a first vector among DFT vectors of W1 may be selected using W2 PMIs 0 and 2 and phase shift between polarized antenna groups may be represented by 1 or −1. In addition, granularity of phase shift may be enhanced or a vector selector of W1 may be configured using k1 and k2k.

When k1 and k2 are set to 1 and 3 in order to enhance granularity of phase shift, the phase shift in rank 1 may be represented by 1, −1, −j, and j.

When k1 and k2 are set to 8 and 10 in order to set a vector selector, the phase shift in rank 1 may be represented by 1 or −1 and a first vector or a third vector may be selected from a DFT vector of W1.

Alternatively, when k1 and k2 are set to 4 and 6 in order to set a vector selector, the phase shift in rank 1 may be represented by 1 or −1 and a first vector or a second vector may be selected from a DFT vector of W1. When (k1, k2) is set to (4,6), two DFT vectors with a high correlation can be selected compared with the case in which (k1, k2) is set to (8,10). That is, when a channel is slowly changed in a time or frequency domain, (k1, k2) may be set to (4,6), thereby enhancing feedback accuracy.

Next, W2 subsampling of 4 Tx codebook in the case of rank 2 will be described below.

k3 and k4 may be set to 0 and 1, respectively so as to include 8Tx codebook subsampling, and the following values may be considered with respect to k=and k6.

A first vector may be selected from a DFT vector of W1 using W2 PMI 0 and 1 in rank 2, and phase shift between polarized antenna groups may be represented by 1 with respect to a first layer and represented by −1 with respect to a second layer or maybe represented by j with respect to a first layer and represented by −j with respect to a second layer. In addition, a vector selector of W1 may be set using k5 and k6.

When k5 and k6 are set to 4 and 5 in order to set a vector selector, phase shift in rank 2 may be represented by (1, −1) or (j, −j) and a first vector or a third vector may be selected from a DFT vector of W1.

Alternatively, when k5 and k6 are set to 2 and 3 in order to set a vector selector, phase shift in rank 1 may be represented by (1, −1) or (j, −j) and a first vector or a second vector maybe selected from a DFT vector of W1. When (k5, k6) is set to (2,3), two DFT vectors with a high correlation can be selected compared with the case in which (k5, k6) is set to (4,5). That is, a channel is slowly changed in a time or frequency domain, (k5, k6) may be set to (2,3), thereby enhancing feedback accuracy.

In addition, k3, k4, k5, and k6 may be set to 0, 2, 4, and 6, respectively to fix phase shift of two layers to (1, −1) and four selectors may be set. That is, when k3, k4, k5, and k6 may be set as such, first, second, third, and fourth vectors may be selected from a DFT vector of W1.

Various values other than k1, k2, k3, k4, k5, and k6 described in the aforementioned example may be considered and an eNB may semi-statically set the values to a UE via high layer signaling (e.g., RRC signaling). That is, in order to reduce feedback overhead, the eNB and the UE may determine various codebook subsampling methods and the UE may determine one method to the UE.

Fifth Embodiment

A fifth embodiment of the present invention relates to a codebook subsampling method when the following 4Tx codebook is used.

A CSI reporting type may be set to one of various types. For example, a CSI reporting type defined in LTE release-10 will now be described. Type 1 reporting supports CQI for UE selection sub-bands. Type 1a reporting supports subband CQI and second PMI feedback. Type 2, Type 2b, and Type 2c reporting supports wideband CQI and PMI feedback. Type 2a reporting supports wideband PMI feedback. Type 3 reporting supports RI feedback. Type 4 reporting supports wideband CQI. Type 5 reporting supports RI and wideband PMI feedback. Type 6 reporting supports RI and PTI feedback.

Hereinafter, when the following 4Tx codebook is used, a W1 subsampling method will be proposed.

The following subsampling method may be applied to type 5 reporting and type 2c reporting in submode A and submode B of PUCCH feedback mode 1-1. The following codebook W1 may set a codeword up to n=0, 1, . . . , 7 so as to constitute one W1 with dense DFT vectors in order to ensure high performance in a correlated channel environment. In addition, the codebook W1 may set a codeword up to n=8, 9, . . . , 15 so as to constitute one W1 with dense DFT vectors in order to ensure high performance in an uncorrelated channel environment.

4 Tx codebook may be represented by multiplication of two matrices as follows.

$$W = W_1 \cdot W_2 \qquad \text{[Equation 51]}$$

Here, the inner precoder $W_1$ and the outer precoder $W_2$ may represent wideband/long-term channel properties and subband/short-term channel properties, respectively. $W_1$ may be set as follows.

$$W_1 = \begin{bmatrix} X_n & 0 \\ 0 & X_n \end{bmatrix}, \qquad \text{[Equation 52]}$$

$$n = 0, 1, \ldots, 15$$

Here, $X_n$ may be set as follows.

$$X_n = \begin{cases} \begin{bmatrix} 1 & 1 & 1 & 1 \\ q_1^{2n} & q_1^{2n+1} & q_1^{2n+2} & q_1^{2n+3} \end{bmatrix} & n = 0, 1, \ldots, 7 \\ \begin{bmatrix} 1 & 1 & 1 & 1 \\ q_1^{2(n-8)} & q_1^{2(n-8)+2} & q_1^{2(n-8)+4} & q_1^{2(n-8)+6} \end{bmatrix} & n = 8, 9, \ldots, 15 \end{cases}, \quad q_1 = e^{2\pi j/16} \qquad \text{[Equation 53]}$$

The codebook $W_2$ for rank 1 may be set as follows.

$$W_2 \in C_2 \left\{ \begin{bmatrix} Y_1 \\ q_2^{m_{r2}} Y_2 \end{bmatrix} \right\}, \qquad \text{[Equation 54]}$$

$$q_2 = e^{2\pi j/8}$$

$$(Y_1, Y_2) \in \begin{cases} \{(e_1, e_1), (e_3, e_3)\} & m_{r2} = 0, 2, 4, 6 \\ \{(e_2, e_2), (e_4, e_4)\} & m_{r2} = 1, 3, 5, 7 \end{cases}$$

In addition, the codebook $W_2$ for rank 2 may be set as follows.

$$W_2 \in C_2 \left\{ \begin{bmatrix} Y_1 & Y_2 \\ q_2^{m_{r2}} Y_1 & -q_2^{m_{r2}} Y_2 \end{bmatrix} \right\}, \qquad \text{[Equation 54]}$$

$$q_2 = e^{2\pi j/8}$$
$$(Y_1, Y_2) \in \{(e_1, e_1), (e_2, e_2), (e_3, e_3),$$
$$(e_4, e_4), (e_1, e_3), (e_2, e_4), (e_1, e_4), (e_2, e_3)\},$$
$$m_{r2} = 0, 2$$

Here, $e_n$ is a 4-element selection vector with all zeros except for the $n^{th}$ element with 1.

It is effective to perform subsampling of W1 by reflecting the aforementioned properties of W1. That is, when 4-bit W1 is subsampled to 2-bit W1, a codeword up to n=0, 1, . . . , 7 is subsampled in order to ensure high performance in a correlated channel environment. In the future, when an eNB and a UE are gradually miniaturized and the number of antennas is increased to reduce an antenna interval, a correlated channel is formed with high probability if possible. Accordingly, it may be effective to subsample a codeword up to n=0, 1, . . . , 7.

Alternatively, when 4-bit W1 is subsampled to 2-bit W1, a codeword up to n=8, 9, . . . , 15 is subsampled in order to ensure high performance in an uncorrelated channel environment. When a specific telecommunication provider installs an eNB with a wide antenna interval, this subsampling method is advantageous.

Alternatively, when 4-bit W1 is subsampled to 2-bit W1, some codewords of n=0, 1, . . . , 7 and some codewords of n=8, 9, . . . , 15 are subsampled in order to ensure high performance both in an uncorrelated channel environment and a correlated channel environment. For example, only an even number n may be substampled to configure a codeword.

The eNB may transmit information about one of the aforementioned W1 subsampling methods to the UE. In detail, a W1 subsampling method may be determined using information added for CSI process configuration. In addition, when various subsampling methods are present for W2, the eNB may signal information about the methods to the UE.

Sixth Embodiment

LTE release-12 has discussed introduction of a new codebook of a dual codebook structure in order to enhance performance with respect to ranks 1 and 2 of 4 Tx codebook and use of legacy release-8 codebook with respect to ranks 3 and 4.

In ranks 1 and 2 of 4 Tx codebook, PMI information applies a dual codebook structure in the form of W1 and W2, and thus PUCCH feedback mode 2-1 for 8 Tx codebook may be used without changes. FIG. 18 illustrates PUCCH feedback mode 2-1 according to a PTI value. Referring to FIG. 18, a wideband W1 is present with periodicity of 8 subframes in PUCCH feedback resource with offset 1 and periodicity 2 and a wideband W2 and CQI are present in the remaining resource. RI and PTI are set with periodicity 16 and offset 0. When PTI is set to 1, L-bit information indicating subband W2 and subband CQI, and a subband index is reported as shown in FIG. 16.

However, in the case of ranks 3 and 4 of 4 Tx codebook, PMI information applies a single matrix codebook structure configured with W instead of a dual codebook structure in the form of W1 and W2. Accordingly, it is difficult to use the PUCCH feedback mode 2-1 of FIG. 18, for supporting a dual codebook, without changes. For example, in the case of ranks 3 and 4, a value of PTI is not necessary.

Hereinafter, two feedback methods will be proposed in order to support PUCCH feedback mode 2-1 for ranks 3 and 4 in 4 Tx codebook.

In a first feedback method, a feedback framework of feedback mode 2-1 is changed according to rank.

Figure 19:
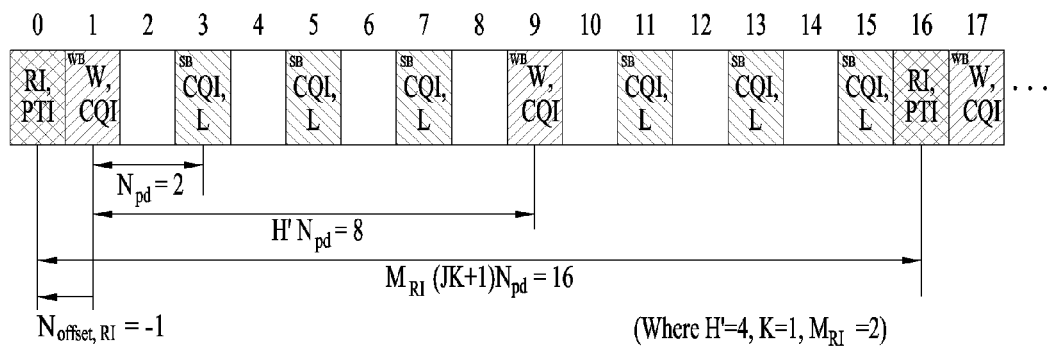
FIG. 19 illustrates an example of PUCCH feedback mode 2-1 in ranks 3 and 4.

According to the first feedback method, PUCCH feedback mode 2-1 in ranks 1 and 2 uses a legacy method as illustrated in FIG. 18, and PUCCH feedback mode 2-1 in ranks 3 and 4 may be set as illustrated in FIG. 19. Referring to FIG. 19, PMI information W and wideband CQI may be present with periodicity of 8 subframes in a PUCCH feedback resource with offset 1 and periodicity 2 and L-bit information indicating a subband CQI and subband index is present in the remaining resource. RI and PTI are set with periodicity 16 and offset 0. That is, the feedback framework of feedback mode 2-1 may be changed according to rank.

When a UE determines and feedbacks a PTI value in ranks 1 and 2, an eNB interprets the PTI value as an effective value to determine a type. On the other hand, the UE may determine and feedback PTI=0 or PTI=1 in ranks 3 and 4. When RI indicates rank 3 or 4, the eNB does not interpret and disregards the PTI value. Alternatively, the UE always fixes and feedbacks PTI=1 and the eNB also recognizes the value. Similarly, the UE always fixes and feedbacks PTI=0 and the eNB also recognizes the value.

When RI re-indicates rank 1 or 2, the UE determines and feedbacks a PTI value and the eNB does not disregard the value and interprets the value to determine a type.

In a second feedback method, a selectable PTI is limited according to rank.

Figure 20:
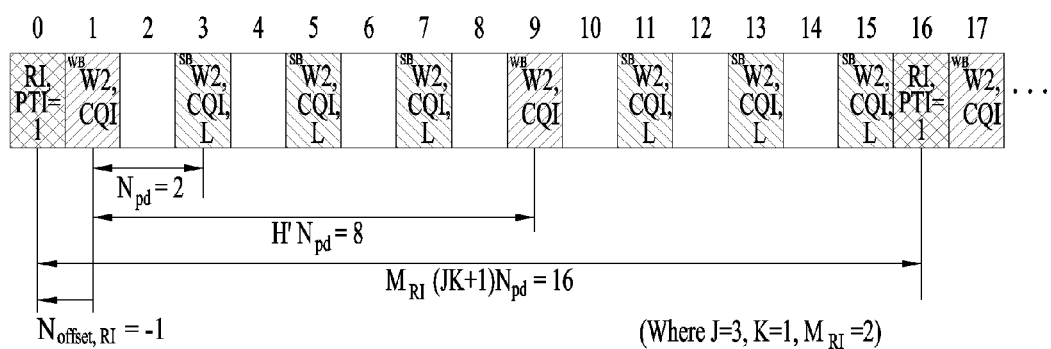
FIG. 20 illustrates an example of PUCCH feedback mode 2-1 in ranks 3 and 4.

According to the second feedback method, PUCCH feedback mode 2-1 in ranks 3 and 4 may be configured as illustrated in FIG. 20. Referring to FIG. 20, a wideband W and a wideband CQI are present with periodicity of 8 subframes in a PUCCH feedback resource with offset 1 and periodicity 2 and L-bit information indicating a subband W, a subband CQI, and a subband index is present in the remaining resource. RI and PTI are set with periodicity 16 and offset 0.

When the L-bit information indicating the subband W, the subband CQI, and the subband index is reported, W2 needs to be subsampled similarly to the case of 8Tx so as not to exceed the size of a payload of PUCCH format. In ranks 3 and 4, CQI is 7 bits and L is a maximum of 2 bits, and thus 2-bit subsampling may be performed with respect to ranks 3 and 4 as shown in one of Tables 12 to 14 below.

TABLE 12

| RI | W2 values |
| --- | --- |
| 1 | {0, 1, 2, 3, 4, 5, 6, 7, 8, 9, 10, 11, 12, 13, 14, 15} |
| 2 | To Be Determined |
| 3 | {0, 2, 8, 10} |
| 4 | {0, 2, 8, 10} |

TABLE 13

| RI | W2 values |
| --- | --- |
| 1 | {0, 1, 2, 3, 4, 5, 6, 7, 8, 9, 10, 11, 12, 13, 14, 15} |
| 2 | To Be Determined |
| 3 | {1, 3, 9, 11} |
| 4 | {1, 3, 9, 11} |

TABLE 14

| RI | W2 values |
| --- | --- |
| 1 | {0, 1, 2, 3, 4, 5, 6, 7, 8, 9, 10, 11, 12, 13, 14, 15} |
| 2 | To Be Determined |
| 3 | {4, 5, 6, 7} |
| 4 | {4, 5, 6, 7} |

One of Tables 12 to 14 above may be set via a 2-bit subsampling method of W2.

The UE and the eNB may determine W1 as an identity matrix and the UE UE may select and signal W2 in a single codebook of ranks 3 and 4.

In the case of ranks 1 and 2, like in a conventional method, when the UE determines and feedbacks a PTI value as 0 or 1, the eNB interprets the value as an effective value to determine a type. On the other hand, in the case of ranks 3 and 4, the UE always determines and feedbacks PTI as 1. When RI re-indicates rank 1 or 2, the UE determines and feedback a PTI value as 0 or 1, and the eNB interprets the value to determine a type.

Figure 21:
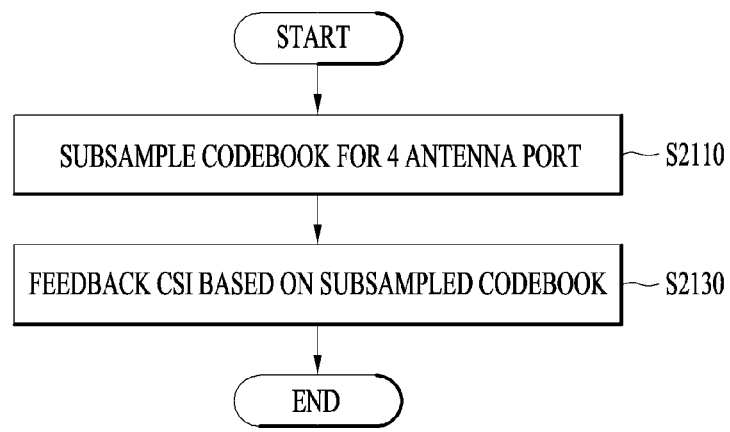
FIG. 21 is a flowchart of a method for transmitting channel state information according to an embodiment of the present invention.

With reference to FIG. 21, a method for reporting channel state (CSI) according to an embodiment of the present invention will be described.

In operation S211, a UE subsamples a codebook for a 4 antenna port.

A detailed subsampling method is the same as a method for subsampling the aforementioned codebook for ranks 3 and 4, and thus a detailed description thereof will be omitted.

In operation S213, the UE feedbacks CSI based on the subsampled codebook.

For example, the CSI may include a rank indicator (RI) reported together with a precoding type indicator (PTI), and when an RI is greater than 2, a PTI may be set to 1.

With regard to the channel state information transmitting method of FIG. 21, the aforementioned various embodiments of the present invention are independently applied or two or more embodiments are simultaneously applied and descriptions of redundant parts are omitted for clarity.

In addition, the same idea as that proposed by the present invention can also be applied to uplink MIMO transmission and reception for MIMO transmission between a BS and a relay (in backhaul uplink and backhaul downlink) and MIMO transmission between a relay and a UE (in access uplink and access downlink).

BS and UE to which Embodiments of the Present Invention are Applicable

Figure 22:
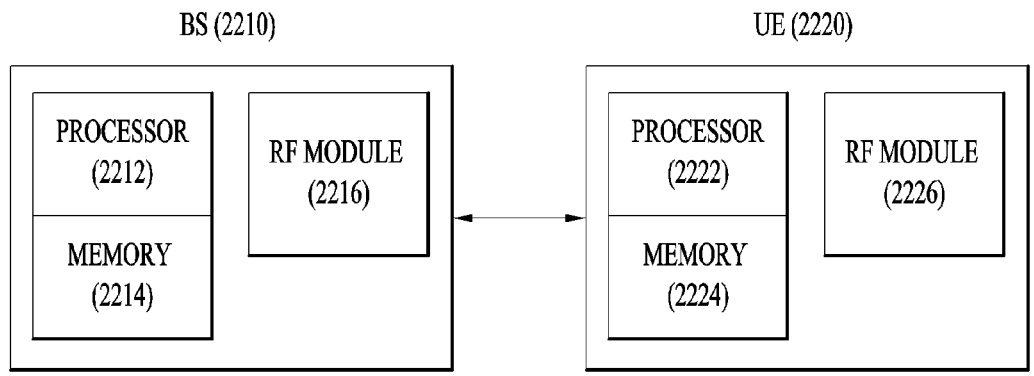
FIG. 22 is a diagram illustrating a BS and a UE to which an embodiment of the present invention is applicable.

FIG. 22 is a diagram illustrating a BS 110 and a UE 120 to which an embodiment of the present invention is applicable.

When a relay is included in a wireless communication system, communication in backhaul link is performed between the BS and the relay, and communication in access link is performed between the relay and the UE. Accordingly, the BS or the UE illustrated in the drawing may be replaced by a relay as necessary.

Referring to FIG. 22, the wireless communication system includes a BS 2210 and a UE 2220. The BS 2210 includes a processor 2212, a memory 2214, and a radio frequency (RF) unit. The processor 2212 may be configured to embody procedures and/or methods proposed by the present invention. The memory 2214 is connected to the processor 2212 and stores various information related to an operation of the processor 2212. The RF unit 2216 is connected to the processor 2212 and transmits and/or receives a radio signal. The UE 2220 includes a processor 2222, a memory 2224, and an RF unit 2226. The processor 2222 may be configured to embody procedures and/or methods proposed by the present invention. The memory 2224 is connected to the processor 2222 and stores various information related to an operation of the processor 2222. The RF unit 2226 is connected to the processor 2222 and transmits and/or receives a radio signal. The BS 2210 and/or the UE 2220 may have a single antenna or a multiple antenna.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc.

The embodiments according to the present invention can be implemented by various means, for example, hardware, firmware, software, or combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor.

The memory unit may be located inside or outside the processor to transmit and receive data to and from the processor through various means which are well known.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The above-described embodiments of the present invention can be applied to a wireless communication system such as a user equipment (UE), a relay, a base station (BS), etc.

The invention claimed is:

1. A method for transmitting a channel state information (CSI) by a user equipment (UE) in a wireless communication system, the method comprising:
determining a Precoding Matrix Indicator (PMI) using a codebook for 4 antenna ports in consideration of a rank indicator (RI); and
reporting the CSI to a base station (BS), wherein the CSI includes the PMI, the RI and a precoding type indicator (PTI),
wherein when the RI is 3 or 4 , the PTI is set to 1 and the PMI is determined by using only 4 precoding matrices out of 16 precoding matrices in the codebook, where the 4 precoding matrices are as follows:

$$W_0 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_8 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix}, \text{ and } W_{10} = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}.$$

2. The method according to claim 1,
wherein when the RI is 3 or 4, only the PMI is reported as a single PMI, and
wherein when the RI is 1 or 2, the PMI and another PMI are reported as dual PMIs.

3. The method according to claim 1,
wherein the CSI is transmitted using a physical uplink control channel mode 2-1.

4. The method according to claim 1,
wherein when the RI is 1 or 2, the PTI is set to 0 or 1.

5. The method according to claim 1,
wherein when the RI is 3 or 4, a final PMI is determined as the PMI, and
wherein when the RI is 1 or 2, a final PMI is determined using the PMI and another PMI.

6. The method according to claim 1, further comprising:
receiving CSI configuration information for reporting the CSI from the BS.

7. The method according to claim 6,
wherein the CSI configuration information is transmitted using radio resource control (RRC) signaling.

8. A user equipment for transmitting a channel state information (CSI) in a wireless communication system, the user equipment comprising:
a radio frequency (RF) unit; and
a processor operably coupled with the RF unit and configured to:
determine a Precoding Matrix Indicator (PMI) using a codebook for 4 antenna ports in consideration of a rank indicator (RI); and
report the CSI to a base station (BS), wherein the CSI includes the PMI, the RI and a precoding type indicator (PTI),
wherein when the RI is 3 or 4, the PTI is set to 1 and the PMI is determined by using only 4 precoding matrices out of 16 precoding matrices in the codebook, where the 4 precoding matrices are as follows:

$$W_0 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_8 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix}, \text{ and } W_{10} = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}.$$

9. The user equipment according to claim 8,
wherein when the RI is 3 or 4, only the PMI is reported as a single PMI, and wherein when the RI is 1 or 2, the PMI and another PMI are reported as dual PMIs.

10. The user equipment according to claim 8, wherein the CSI is transmitted using a physical uplink control channel mode 2-1.

11. The user equipment according to claim 8, wherein when the RI is 1 or 2, the PTI is set to 0 or 1.

12. The user equipment according to claim 8, wherein when the RI is 3 or 4, a final PMI is determined as the PMI, and
wherein when the RI is 1 or 2, a final PMI is determined using the PMI and another PMI.

13. The user equipment according to claim 8, wherein the processor is configured to receive CSI configuration information for reporting the CSI from the BS.

14. The user equipment according to claim 13, wherein the CSI configuration information is transmitted using radio resource control (RRC) signaling.

* * * * *